US011256625B2

(12) United States Patent
Krueger

(10) Patent No.: US 11,256,625 B2
(45) Date of Patent: Feb. 22, 2022

(54) PARTITION IDENTIFIERS FOR PAGE TABLE WALK MEMORY TRANSACTIONS

(71) Applicant: Arm Limited, Cambridge (GB)

(72) Inventor: Steven Douglas Krueger, Austin, TX (US)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 16/565,839

(22) Filed: Sep. 10, 2019

(65) Prior Publication Data

US 2021/0073131 A1 Mar. 11, 2021

(51) Int. Cl.
  *G06F 12/08* (2016.01)
  *G06F 12/0846* (2016.01)
  *G06F 3/06* (2006.01)
  *G06F 9/30* (2018.01)
  *G06F 9/455* (2018.01)
  (Continued)

(52) U.S. Cl.
  CPC ........ *G06F 12/0848* (2013.01); *G06F 3/0622* (2013.01); *G06F 3/0644* (2013.01); *G06F 3/0653* (2013.01); *G06F 3/0685* (2013.01); *G06F 9/30101* (2013.01); *G06F 9/45558* (2013.01); *G06F 9/467* (2013.01); *G06F 9/5016* (2013.01); *G06F 9/5061* (2013.01); *G06F 12/1009* (2013.01)

(58) Field of Classification Search
  CPC .. G06F 12/0848; G06F 3/0622; G06F 3/0644; G06F 3/0653; G06F 3/0685; G06F 9/30101; G06F 9/45558; G06F 9/467; G06F 9/5016; G06F 9/5061; G06F 12/1009

USPC ........................................................ 711/129
See application file for complete search history.

(56) References Cited

U.S. PATENT DOCUMENTS 4,376,297 A  3/1983  Anderson
5,404,476 A  4/1995  Kadaira
(Continued)

FOREIGN PATENT DOCUMENTS

FR  3 019 921  10/2015
GB  2 421 821   7/2006
(Continued)

OTHER PUBLICATIONS

Khang, "Introduction to Cache Allocation Technology in the Intel Xeon Processor E5 v4 Family", submitted Feb. 11, 2016, 4 pages.
(Continued)

*Primary Examiner* — Gautam Sain
(74) *Attorney, Agent, or Firm* — Nixon & Vanderhye P.C.

(57) ABSTRACT

Memory transactions can be tagged with a partition identifier selected depending on which software execution environment caused the memory transaction to be issued. A memory system component can control allocation of resources for handling the memory transaction or manage contention for said resources depending on a selected set of memory system component parameters selected depending on the partition identifier specified by the memory transaction, or can control, depending on the partition identifier specified by the memory transaction, whether performance monitoring data is updated in response to the memory transaction. Page table walk memory transactions may be assigned a different partition identifier to the partition identifier assigned to the corresponding data/instruction access memory transaction.

16 Claims, 16 Drawing Sheets

(51) Int. Cl.
    *G06F 9/46*     (2006.01)
    *G06F 9/50*     (2006.01)
    *G06F 12/1009*     (2016.01)

(56) References Cited

U.S. PATENT DOCUMENTS

| | | | |
|---|---|---|---|
| 5,790,979 | A | 8/1998 | Liedtke |
| 5,796,978 | A | 8/1998 | Yoshioka |
| 5,924,127 | A | 7/1999 | Kawamoto |
| 6,629,220 | B1 | 9/2003 | Dyer |
| 7,069,413 | B1 | 6/2006 | Agesen et al. |
| 9,172,655 | B1 | 10/2015 | Dropps |
| 2005/0055510 | A1 | 3/2005 | Hass et al. |
| 2006/0136639 | A1 | 6/2006 | Futral |
| 2009/0282405 | A1 | 11/2009 | Moir et al. |
| 2009/0327646 | A1 | 12/2009 | Jordan et al. |
| 2010/0058026 | A1 | 3/2010 | Heil |
| 2010/0306499 | A1 | 12/2010 | Petolino, Jr. |
| 2011/0145512 | A1 | 6/2011 | Adl-Tabatabai et al. |
| 2013/0013889 | A1 | 1/2013 | Devaraj et al. |
| 2013/0076768 | A1 | 3/2013 | Chakraborty et al. |
| 2013/0179892 | A1 | 7/2013 | Frazier |
| 2014/0101306 | A1 | 4/2014 | Murgia |
| 2014/0101340 | A1 | 4/2014 | Jandhyam |
| 2014/0123146 | A1 | 5/2014 | Barrow-Williams |
| 2014/0181821 | A1 | 6/2014 | Shavit et al. |
| 2014/0195743 | A1 | 7/2014 | Fleischer |
| 2015/0039763 | A1 | 2/2015 | Chaudhary |
| 2015/0089153 | A1 | 3/2015 | Busaba et al. |
| 2015/0089185 | A1 | 3/2015 | Brandyberry |
| 2015/0213153 | A1 | 7/2015 | Shah et al. |
| 2015/0242214 | A1 | 8/2015 | Busaba et al. |
| 2015/0242218 | A1 | 8/2015 | Shum et al. |
| 2015/0242248 | A1 | 8/2015 | Busaba et al. |
| 2015/0301951 | A1 | 10/2015 | Bybell |
| 2015/0301953 | A1 | 10/2015 | Bybell |
| 2015/0347138 | A1 | 12/2015 | Gschwind et al. |
| 2017/0010968 | A1 | 1/2017 | Li |
| 2018/0004678 | A1* | 1/2018 | Bogusz ............... G06F 12/1027 |
| 2018/0095892 | A1* | 4/2018 | Wilkinson ............ G06F 12/145 |
| 2018/0150251 | A1* | 5/2018 | Parker ................. G06F 12/1491 |
| 2018/0157601 | A1 | 6/2018 | Bryant |
| 2018/0203609 | A1 | 7/2018 | Krueger |
| 2018/0203610 | A1 | 7/2018 | Krueger |
| 2018/0203807 | A1* | 7/2018 | Krueger ............... G06F 12/0875 |

FOREIGN PATENT DOCUMENTS

| | | |
|---|---|---|
| GB | 2 539 429 | 12/2016 |
| GB | 2 539 433 | 12/2016 |
| GB | 2 539 435 | 12/2016 |
| GB | 2 539 436 | 12/2016 |
| WO | 2005/036405 | 4/2005 |
| WO | 2014/122415 | 8/2014 |
| WO | 2016/196855 | 12/2016 |

OTHER PUBLICATIONS

Khang, "Benefits of Intel Cache Monitoring Technology in the Intel Xeon Processor E5 v3 Family", submitted Sep. 8, 2014, 2 pages.
"Improving Real-Time Performance by Utilizing Cache Allocation Technology", Enhancing Performance via Application of the Processor's Cache, intel, Apr. 2015, 16 pages.
Khang, "Introduction to Memory Bandwidth Monitoring in the Intel Xeon Processor E5 v4 Family", submitted Feb. 11, 2016, 3 pages.
Notice of Allowance for U.S. Appl. No. 15/646,406 dated Jan. 29, 2020, 9 pages.
U.S. Appl. No. 15/405,661, filed Jan. 13, 2017; Inventor: Krueger.
U.S. Appl. No. 15/405,691, filed Jan. 13, 2017; Inventor: Krueger.
U.S. Appl. No. 15/405,563, filed Jan. 13, 2017; Inventor: Krueger.
U.S. Appl. No. 15/405,572, filed Jan. 13, 2017; Inventor: Krueger.
U.S. Appl. No. 15/405,625, filed Jan. 13, 2017; Inventor: Krueger.
U.S. Appl. No. 15/646,406, filed Jul. 11, 2017; Inventor: Swaine.
International Search Report and Written Opinion of the International Searching Authority dated Mar. 13, 2018 in PCT/GB2017/053661, 18 pages.
International Search Report and Written Opinion of the International Searching Authority dated Mar. 21, 2018 in PCT/GB2017/053662, 15 pages.
Partial International Search Report and Invitation to Pay Additional Fees dated Feb. 26, 2018 in PCT/GB2017/053663, 13 pages.
International Search Report and Written Opinion of the International Searching Authority dated Mar. 21, 2018 in PCT/GB2017/053664, 15 pages.
International Search Report and Written Opinion of the International Searching Authority dated Mar. 21, 2018 in PCT/GB2017/053680, 14 pages.
Office Action dated May 4, 2018 in co-pending U.S. Appl. No. 15/405,661, 22 pages.
Office Action dated May 17, 2018 in co-pending U.S. Appl. No. 15/405,691, 25 pages.
Office Action dated Oct. 30, 2018 in co-pending U.S. Appl. No. 15/646,406, 24 pages.
Final Office Action dated Dec. 14, 2018 in co-pending U.S. Appl. No. 15/405,661, 24 pages.
Final Office Action dated Feb. 13, 2019 in co-pending U.S. Appl. No. 15/646,406, 21 pages.
Office Action dated Feb. 21, 2019 in co-pending U.S. Appl. No. 15/405,572, 26 pages.
Office Action dated Mar. 7, 2019 in co-pending U.S. Appl. No. 15/405,625, 30 pages.
Office Action dated Jun. 3, 2019 in co-pending U.S. Appl. No. 15/646,406, 20 pages.
Office Action dated Jun. 13, 2019 in co-pending U.S. Appl. No. 15/405,563, 20 pages.
Final Office Action dated Oct. 11, 2019 in co-pending U.S. Appl. No. 15/646,406, 21 pages.
C. Jacobi et al., "Transactional Memory Architecture and Implementation for IBM System z" *2012 IEEE/ACM 45th Annual International Symposium on Microarchitecture*, Dec. 1, 2012, pp. 25-36.
W. Zhao et al., "Dynamic Memory Balancing for Virtual Machines" *VEE'09 Proceedings of the 2009 ACM SIGPLAN/SIGOPS International Conference on Virtual Execution Environments*, Mar. 11-13, 2009, pp. 21-30.
S. Groesbrink et al., "Modular Paging with Dynamic TLB Partitioning for Embedded Real-Time Systems" IEEE, SIES 2008, Jun. 2008, pp. 261-264.
Channon et al., "Performance Analysis of Re-configurable Partitioned TLBs" 1997, IEEE, HICSS 1997, pp. 168-177.
D. Culler et al., "Parallel Computer Architecture: A Hardware/Software Approach" 1997, Morgan Kaufmann Publishers, pp. 407-408.
B. Jacob et al., "Memory Systems: Cache, DRAM, Disk" 2008, Morgan Kaufmann Publishers, pp. 910-920.
International Search Report and Written Opinion of the International Searching Authority for PCT/GB2020/051969 dated Nov. 2, 2020, 17 pages.

* cited by examiner

PARTITION IDENTIFIERS FOR PAGE TABLE WALK MEMORY TRANSACTIONS

BACKGROUND

Technical Field

The present technique relates to the field of data processing.

Technical Background

Two or more software execution environments, such as applications or virtual machines, may be executed on the same data processing system with access to a common memory system shared between software execution environments. For some systems it may be important that the performance of one software execution environment is not held back due to another software execution environments using too much resource in the shared memory system. This problem can be referred to as the "noisy neighbour" problem and can be particularly significant for enterprise networking or server systems for example.

SUMMARY

At least some examples provide an apparatus comprising: processing circuitry to process instructions from one of a plurality of software execution environments; and at least one memory system component to handle memory transactions issued by the processing circuitry in response to the instructions; in which: in response to a memory transaction issued by the processing circuitry specifying a partition identifier selected depending on which software execution environment caused the memory transaction to be issued, the at least one memory system component is configured to control allocation of resources for handling the memory transaction or manage contention for said resources depending on a selected set of memory system component parameters selected depending on the partition identifier specified by the memory transaction, or to control, depending on the partition identifier specified by the memory transaction, whether performance monitoring data is updated in response to the memory transaction; and when a page table walk memory transaction is issued by the processing circuitry to request access to page table data required for obtaining a translated target address of a corresponding data/instruction access memory transaction, the processing circuitry is capable of assigning, to the page table walk memory transaction, a different partition identifier to the partition identifier assigned to the corresponding data/instruction access memory transaction.

At least some examples provide an apparatus comprising: means for processing instructions from one of a plurality of software execution environments; and at least one means for handling memory transactions issued by the means for processing in response to the instructions; in which: in response to a memory transaction issued by the means for processing specifying a partition identifier selected depending on which software execution environment caused the memory transaction to be issued, the at least one means for handling memory transactions is configured to control allocation of resources for handling the memory transaction or manage contention for said resources depending on a selected set of memory system component parameters selected depending on the partition identifier specified by the memory transaction, or to control, depending on the partition identifier specified by the memory transaction, whether performance monitoring data is updated in response to the memory transaction; and when a page table walk memory transaction is issued by the means for processing to request access to page table data required for obtaining a translated target address of a corresponding data/instruction access memory transaction, the means for processing is capable of assigning, to the page table walk memory transaction, a different partition identifier to the partition identifier assigned to the corresponding data/instruction access memory transaction.

At least some examples provide a method comprising: processing instructions from one of a plurality of software execution environments; and handling memory transactions issued in response to the instructions; in which: in response to a memory transaction specifying a partition identifier selected depending on which software execution environment caused the memory transaction to be issued, at least one memory system component controls allocation of resources for handling the memory transaction or manages contention for said resources depending on a selected set of memory system component parameters selected depending on the partition identifier specified by the memory transaction, or controls, depending on the partition identifier specified by the memory transaction, whether performance monitoring data is updated in response to the memory transaction; and when a page table walk memory transaction is issued to request access to page table data required for obtaining a translated target address of a corresponding data/instruction access memory transaction, the partition identifier assigned to the page table walk memory transaction is allowed to be a different partition identifier to the partition identifier assigned to the corresponding data/instruction access memory transaction.

DESCRIPTION OF EXAMPLES

Figure 1:
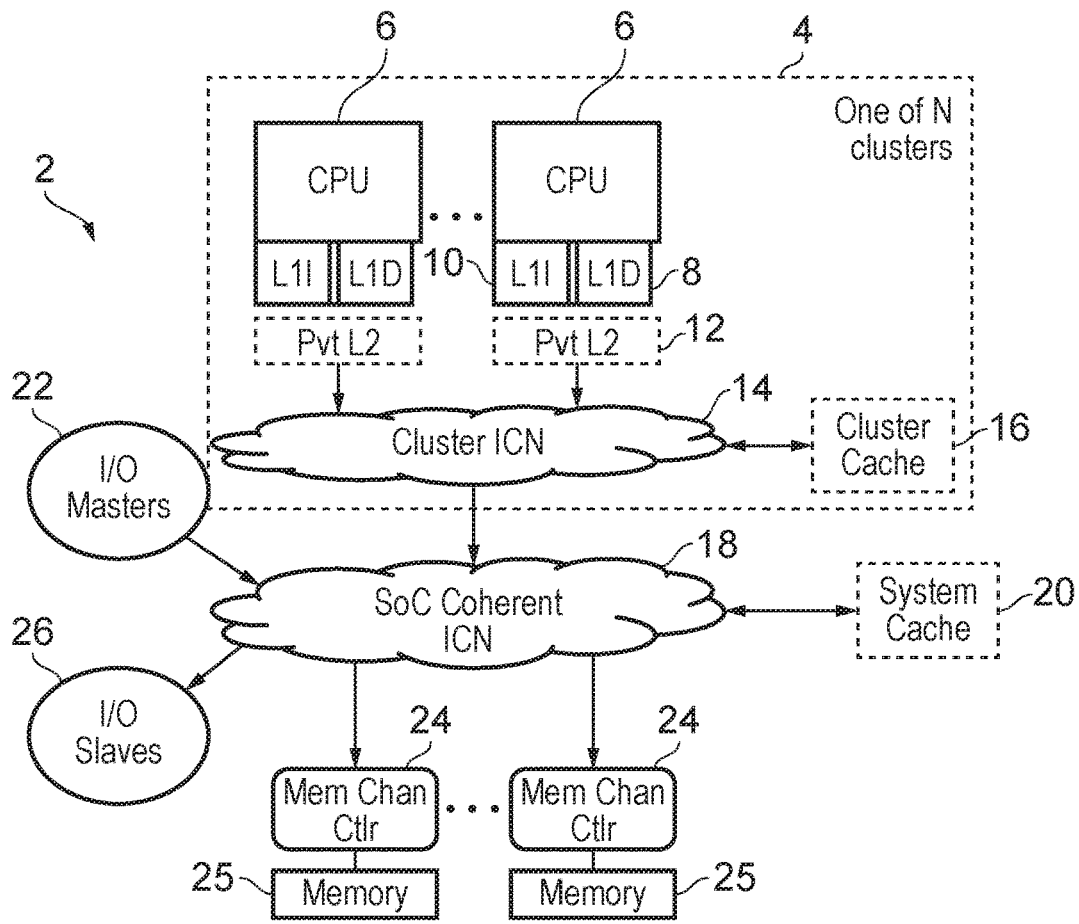
FIG. 1 schematically illustrates an example of a data processing system comprising a memory system.

An apparatus may have processing circuitry to process instructions from one of a number of software execution environments, and at least one memory system component for handling memory transactions issued by the processing circuitry in response to the instructions. Memory transactions can be assigned a partition identifier which is selected depending on which software execution environment caused the memory transaction to be issued. At least one memory system component can use the partition identifier to control allocation of resources or management of contention for resources depending on a set of memory system component parameters selected based on the partition identifier. Also, or instead, the partition identifier could be used to control whether performance monitoring data is updated in response to the memory transaction.

Hence, the processing circuity may present partition identifiers as labels for memory transactions depending on which software issued the transaction. This means that resources in the memory system can be partitioned between software execution environments to avoid one software execution environment taking more than its fair share of resource, to address the noisy neighbour problem described above.

However, the inventor recognised that not all memory transactions issued when executing a given software execution environment may be accessing information related to that environment. As discussed in more detail below, for page table walk memory transactions which are issued to request access to page table data required for obtaining a translated target address of a corresponding data/instruction access memory transaction, sometimes the page table data may be managed by a software execution environment executing at a higher level of privilege than the execution environment which issued the data or instruction access memory transaction. If any memory resource consumed by the page table walk memory transaction was consumed as part of the resource allocation for the lower privilege execution environment which issued the page table walk request, this may take away resource which could be used for other memory transactions issued by that software execution environment, which could provide an unfair imbalance between the relative amounts of memory resource assigned to different software execution environments. For example, this could lead to the first of two or more software execution environments which share access to common page table data consuming some of its resource because it was the first to access the page table data, and then other execution environments which use the same page table data may have greater resource because their data/instruction access memory transactions were able to use page table data already cached in response to the first software execution environment, so that software execution environments which may have been provided with substantially equal resource allocations may in fact end up with an imbalance in performance.

Hence, some embodiments are discussed below which enable the processing circuitry to assign, to the page table walk memory transaction, a different partition identifier to the partition identifier assigned to the corresponding data/instruction access memory transaction. This can enable the resource partitioning to correspond more accurately to the way in which the page table data is managed for the different software execution environments, to provide fairer resource partitioning.

Before discussing the control of partition identifiers for page table walk memory transactions, first a general architecture for setting partition identifiers for a software execution environment and using those partition identifiers to control resource allocation or management and/or performance monitoring in the memory system is described. After the general architecture has been described, the features of controlling page table walk memory transactions will be discussed below in this section headed 'Controlling Partition Identifiers for Page Table Walk Memory Transactions'.

General Architecture for Memory Resource and Performance Monitoring Partitioning FIG. 1 schematically illustrates an example of a data processing system 2 comprising N processing clusters 4 (N is 1 or more), where each processing cluster includes one or more processing units 6 such as a CPU (central processing unit) or GPU (graphics processing unit). Each processing unit 6 may have at least one cache, e.g. a level 1 data cache 8, level 1 instruction cache 10 and shared level 2 cache 12. It will be appreciated that this is just one example of a possible cache hierarchy and other cache arrangements could be used. The processing units 6 within the same cluster are coupled by a cluster interconnect 14. The cluster interconnect may have a cluster cache 16 for caching data accessible to any of the processing units.

A system on chip (SoC) interconnect 18 couples the N clusters and any other master devices 22 (such as display controllers or direct memory access (DMA) controllers). The SoC interconnect may have a system cache 20 for caching data accessible to any of the masters connected to it. The SoC interconnect 18 controls coherency between the respective caches 8, 10, 12, 16, 20 according to any known coherency protocol. The SoC interconnect is also coupled to one or more memory controllers 24, each for controlling access to a corresponding memory 25, such as DRAM or SRAM. The SoC interconnect 18 may also direct transactions to other slave devices, such as a crypto unit for providing encryption/decryption functionality.

Hence, the data processing system 2 comprises a memory system for storing data and providing access to the data in response to transactions issued by the processing units 6 and other master devices 22. The caches 8, 10, 12, 16, 20, the interconnects 14, 18, memory controllers 24 and memory devices 25 can each be regarded as a component of the memory system. Other examples of memory system components may include memory management units or translation lookaside buffers (either within the processing units 6 themselves or further down within the system interconnect 18 or another part of the memory system), which are used for translating memory addresses used to access memory, and so can also be regarded as part of the memory system. In general, a memory system component may comprise any component of a data processing system used for servicing memory transactions for accessing memory data or controlling the processing of those memory transactions.

The memory system may have various resources available for handling memory transactions. For example, the caches 8, 10, 12, 16, 20 have storage capacity available for caching data required by a given software execution environment executing on one of the processors 6, to provide quicker access to data or instructions than if they had to be fetched from main memory 25. Similarly, MMUs/TLBs may have capacity available for caching address translation data. Also, the interconnects 14, 18, the memory controller 24 and the memory devices 25 may each have a certain amount of bandwidth available for handling memory transactions.

When multiple software execution environments executing on the processing elements 6 share access to the memory system, it can be desirable to prevent one software execution environment using more than its fair share of resource, to prevent other execution environments perceiving a loss of performance. This can be particularly important for data center (server) applications where there is an increasing demand to reduce capital expenditure by increasing the number of independent software processes which interact with a given amount of memory capacity, to increase utilization of the data center servers. Nevertheless, there will still be a demand to meet web application tail latency objectives and so it is undesirable if one process running on the server can monopolise memory system resources to an extent that other processes suffer. Similarly, for networking applications, it is increasingly common to combine multiple functions onto a single SoC which previously would have been on separate SoCs. This again leads to a desire to limit performance interactions between software execution environments, and to monitor how those need to allow those independent processes to access the shared memory while limiting performance interactions.

Figure 2:
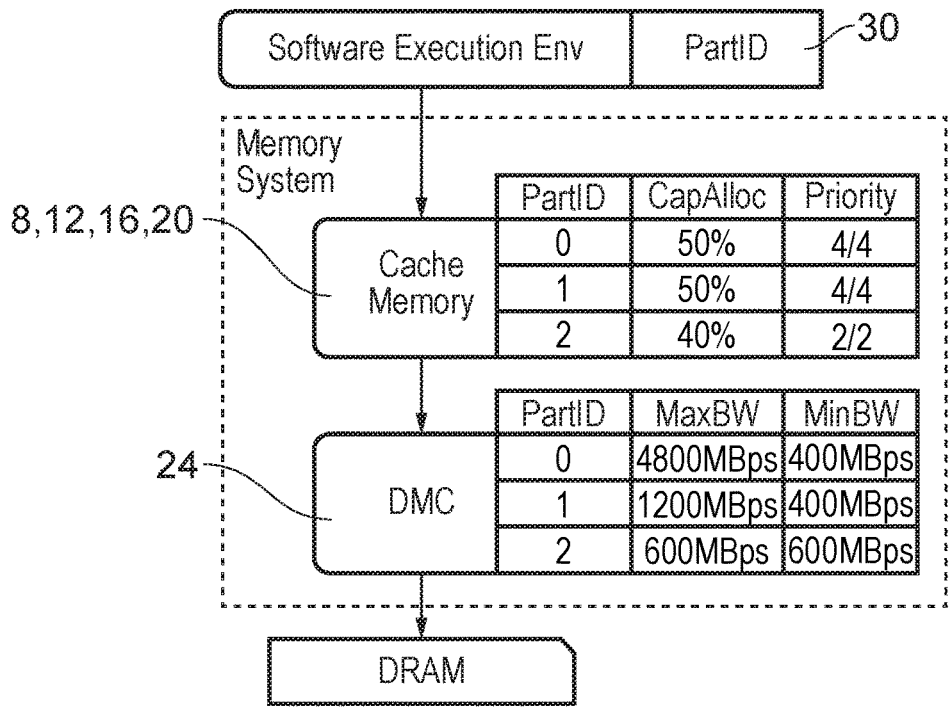
FIG. 2 schematically illustrates an example of partitioning control of memory system resources in dependence on a partition identifier allocated to a software execution environment associated with a memory transaction.

FIG. 2 schematically illustrates an example of partitioning the control of allocation of memory system resources in dependence on the software execution environment which issues the corresponding memory transactions. In this context, a software execution environment may be any process, or part of a process, executed by a processing unit within a data processing system. For example, a software execution environment may comprise an application, a guest operating system or virtual machine, a host operating system or hypervisor, a security monitor program for managing different security states of the system, or a sub-portion of any of these types of processes (e.g. a single virtual machine may have different parts considered as separate software execution environments). As shown in FIG. 2, each software execution environment may be allocated a given partition identifier 30 which is passed to the memory system components along with memory transactions that are associated with that software execution environment.

Within the memory system component, resource allocation or contention resolution operations can be controlled based on one of a number of sets of memory system component parameters selected based on the partition identifier. For example, as shown in FIG. 2, each software execution environment may be assigned an allocation threshold representing a maximum amount of cache capacity that can be allocated for data/instructions associated with that software execution environment, with the relevant allocation threshold when servicing a given transaction being selected based on the partition identifier associated with the transaction. For example, in FIG. 2 transactions associated with partition identifier 0 may allocate data to up to 50% of the cache's storage capacity, leaving at least 50% of the cache available for other purposes.

Similarly, in a memory system component such as the memory controller 24 which has a finite amount of bandwidth available for servicing memory transactions, minimum and/or maximum bandwidth thresholds may be specified for each partition identifier. A memory transaction associated with a given partition identifier can be prioritised if, within a given period of time, memory transactions specifying that partition identifier have used less than the minimum amount of bandwidth, while a reduced priority can be used for a memory transaction if the maximum bandwidth has already been used or exceeded for transactions specifying the same partition identifier.

These control schemes will be discussed in more detail below. It will be appreciated that these are just two examples of ways in which control of memory system resources can be partitioned based on the software execution environment that issued the corresponding transactions. In general, by allowing different processes to "see" different partitioned portions of the resources provided by the memory system, this allows performance interactions between the processes to be limited to help address the problems discussed above.

Similarly, the partition identifier associated with memory transactions can be used to partition performance monitoring within the memory system, so that separate sets of performance monitoring data can be tracked for each partition identifier, to allow information specific to a given software execution environment (or group of software execution environments) to be identified so that the source of potential performance interactions can be identified more easily than if performance monitoring data was recorded across all software execution environments as a whole. This can also help diagnose potential performance interaction effects and help with identification of possible solutions.

An architecture is discussed below for controlling the setting of partition identifiers, labelling of memory transactions based on the partition identifier set for a corresponding software execution environment, routing the partition identifiers through the memory system, and providing partition-based controls at a memory system component in the memory system. This architecture is scalable to a wide range of uses for the partition identifiers. The use of the partition identifiers is intended to layer over the existing architectural semantics of the memory system without changing them, and so addressing, coherence and any required ordering of memory transactions imposed by the particular memory protocol being used by the memory system would not be affected by the resource/performance monitoring partitioning. When controlling resource allocation using the partition identifiers, while this may affect the performance achieved when servicing memory transactions for a given software execution environment, it does not affect the result of an architecturally valid computation. That is, the partition identifier does not change the outcome or result of the memory transaction (e.g. what data is accessed), but merely affects the timing or performance achieved for that memory transaction.

Figure 3:
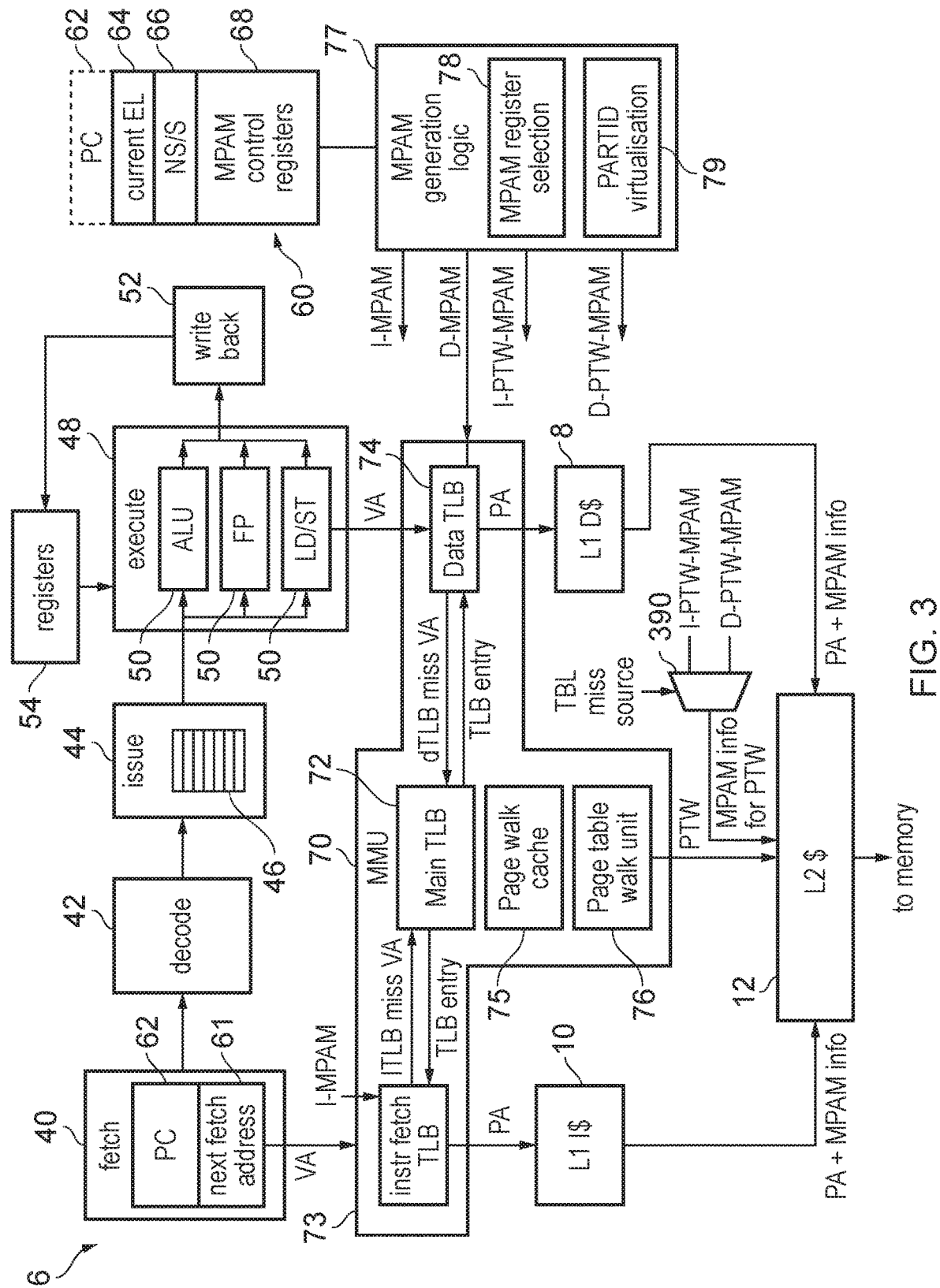
FIG. 3 schematically illustrates an example of processing circuitry for issuing memory transactions specifying a partition identifier.

FIG. 3 schematically illustrates an example of the processing unit 6 in more detail. The processor includes a processing pipeline including a number of pipeline stages, including a fetch stage 40 for fetching instructions from the instruction cache 10, a decode stage 42 for decoding the fetched instructions, an issue stage 44 comprising an issue queue 46 for queueing instructions while waiting for their operands to become available and issuing the instructions for execution when the operands are available, an execute stage 48 comprising a number of execute units 50 for executing different classes of instructions to perform corresponding processing operations, and a write back stage 52 for writing results of the processing operations to data registers 54. Source operands for the data processing operations may be read from the registers 54 by the execution stage 48. In this example, the execute stage 48 includes an ALU (arithmetic/logic unit) for performing arithmetic or logical operations, a floating point (FP) unit for performing operations using floating-point values and a load/store unit for performing load operations to load data from the memory system into registers 54 or store operations to store data from registers 54 to the memory system. It will be appreciated that these are just some examples of possible execution units and other types could be provided. Similarly, other examples may have different configurations of pipeline stages. For example, in an out-of-order processor, an additional register renaming stage may be provided for remapping architectural register specifiers specified by instructions to physical register specifiers identifying registers 54 provided in hardware, as well as a reorder buffer for tracking the execution and commitment of instructions executed in a different order to the order in which they were fetched from the cache 10. Similarly, other mechanisms not shown in FIG. 1 could still be provided, e.g. branch prediction functionality could be provided at the fetch stage to control generation of a next fetch address 61 based on predicted outcomes of branch instructions.

The processor 6 has a number of control registers 60, including for example a program counter register 62 for storing a program counter indicating a current point of execution of the program being executed, an exception level register 64 for storing an indication of a current exception level at which the processor is executing instructions, a security state register 66 for storing an indication of whether the processor is in a non-secure or a secure state, and memory partitioning and monitoring (MPAM) control registers 68 for controlling memory system resource and performance monitoring partitioning (the MPAM control registers are discussed in more detail below). It will be appreciated that other control registers could also be provided. The program counter register 62 is shown in FIG. 3 as being maintained by the fetch stage 40, but it may also be accessible to other stages, e.g. the execute stage 48.

The processor has a memory management unit (MMU) 70 for controlling access to the memory system in response to memory transactions. For example, when encountering a load or store instruction, the load/store unit issues a corresponding memory transaction specifying a virtual address. The virtual address is provided to the memory management unit (MMU) 70 which translates the virtual address into a physical address using address mapping data stored in one or more translation lookaside buffer (TLB)s 72, 73, 74. The TLBs may include a data TLB 74 acting as a level-1 TLB for data accesses initiated by the load/store unit 50, an instruction TLB 73 acting as a level-1 TLB for instruction fetch accesses initiated by the fetch stage 40, and a main TLB 72 acting as a shared level-2 TLB for both instruction and data accesses, which is accessed on a miss in the level-1 TLBs 73, 74. Each TLB 72-74 stores a number of TLB entries. Each TLB entry may identify not only the mapping data identifying how to translate the address, but also associated access permission data which defines whether the processor is allowed to read or write to addresses in the corresponding page of the address space. In some examples there may be multiple stages of address translation and so there may be multiple TLBs, for example a stage 1 TLB providing a first stage of translation for mapping the virtual address generated by the load/store unit 50 to an intermediate physical address, and a stage 2 TLB providing a second stage of translation for mapping the intermediate physical address to a physical address used by the memory system to identify the data to be accessed. The mapping data for the stage 1 TLB may be set under control of an operating system, while the mapping data for the stage 2 TLB may be set under control of a hypervisor, for example, to support virtualisation. It will be appreciated that the arrangement of TLBs shown in FIG. 3 is just one example, and other implementations could have a different set of TLBs.

In addition to the TLBs 72, 73, 74, the MMU may also comprise other types of cache, such as a page walk cache 75 for caching data used for identifying mapping data to be loaded into the TLB during a page table walk. The memory system may store page tables specifying address mapping data for each page of a virtual memory address space. The TLBs 72, 73, 74 may cache a subset of those page table entries for a number of recently accessed pages. If the processor issues a memory transaction to a page which does not have corresponding address mapping data stored in the TLBs 72, 73, 74 then a page table walk is initiated by page table walk unit 76. This can be relatively slow because there may be multiple levels of page tables to traverse in memory to identify the address mapping entry for the required page. To speed up page table walks, recently accessed page table entries of the page table can be placed in the page walk cache 75. These would typically be page table entries other than the final level page table entry which actually specifies the mapping for the required page. These higher level page table entries would typically specify where other page table entries for corresponding ranges of addresses can be found in memory. By caching at least some levels of the page table traversed in a previous page table walk in the page walk cache 75, page table walks for other addresses sharing the same initial part of the page table walk can be made faster. Alternatively, rather than caching the page table entries themselves, the page walk cache 75 could cache the addresses at which those page table entries can be found in the memory, so that again a given page table entry can be accessed faster than if those addresses had to be identified by first accessing other page table entries in the memory.

Figure 4:
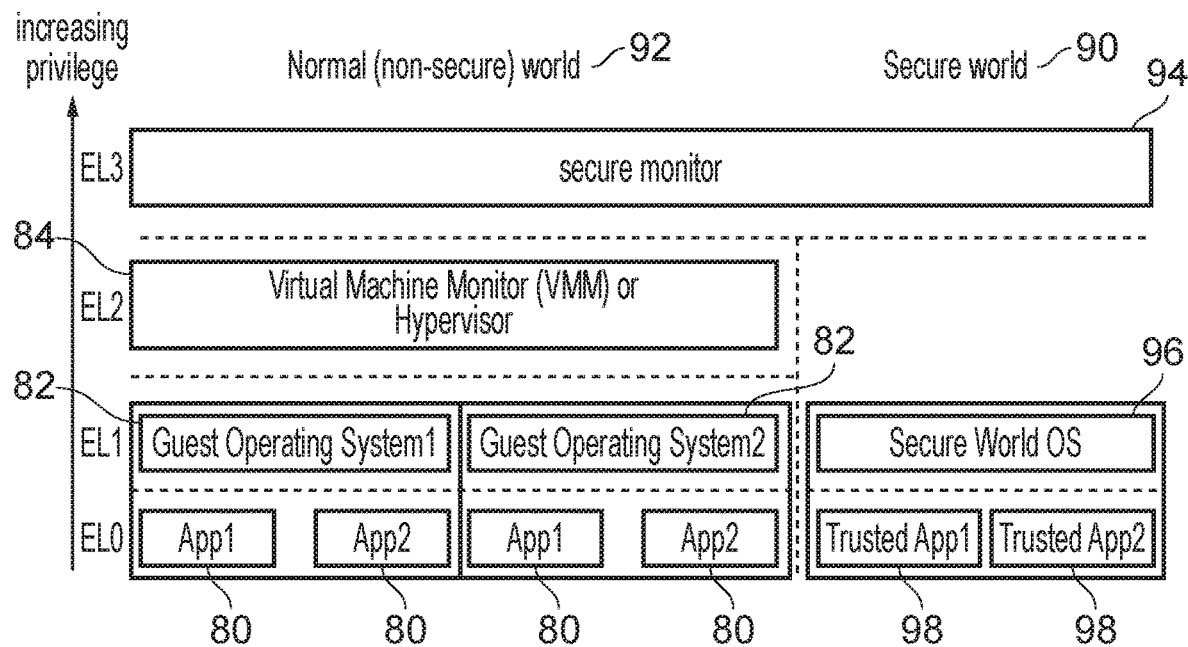
FIG. 4 shows an example of different software execution environments executed by the processing circuitry.

FIG. 4 shows an example of different software execution environments which may be executed by the processor 6. In this example the architecture supports four different exception levels EL0 to EL3 increasing in privilege level (so that EL3 has the highest privilege exception level and EL0 has the lowest privilege exception level). In general, a higher privilege level has greater privilege than a lower privilege level and so can access at least some data and/or carry out some processing operations which are not available to a lower privilege level. Applications 80 are executed at the lowest privilege level EL0. A number of guest operating systems 82 are executed at privilege level EL1 with each guest operating system 82 managing one or more of the applications 80 at EL0. A virtual machine monitor, also known as a hypervisor or a host operating system, 84 is executed at exception level EL2 and manages the virtualisation of the respective guest operating systems 82. It is possible that some applications at EL0 could be managed directly by the host operating system at EL2 without an intervening operating system at EL1.

Transitions from a lower exception level to a higher exception level may be caused by exception events (e.g. events required to be handled by the hypervisor or host operating system may cause a transition to EL2), while transitions back to a lower level may be caused by return from handling an exception event. Some types of exception events may be serviced at the same exception level as the level they are taken from, while others may trigger a transition to a higher exception state. The current exception level register 64 indicates which of the exception levels EL0 to EL3 the processing circuitry 6 is currently executing code in.

In this example the system also supports partitioning between a secure domain 90 and a normal (less secure) domain 92. Sensitive data or instructions can be protected by allocating them to memory addresses marked as accessible to the secure domain 90 only, with the processor having hardware mechanisms for ensuring that processes executing in the less secure domain 92 cannot access the data or instructions. For example, the access permissions set in the MMU 70 may control the partitioning between the secure and non secure domains, or alternatively a completely separate security memory management unit may be used to control the security state partitioning, with separate secure and non secure MMUs 70 being provided for sub-control within the respective security states. Transitions between the secure and normal domains 90, 92 may be managed by a secure monitor process 94 executing at the highest privilege level EL3. This allows transitions between domains to be tightly controlled to prevent non-secure operations 80 or operating systems 82 for example accessing data from the secure domain. In other examples, hardware techniques may be used to enforce separation between the security states and police transitions, so that it is possible for code in the normal domain 92 to branch directly to code in the secure domain 90 without transitioning via a separate secure monitor process 94. However, for ease of explanation, the subsequent description below will refer to an example which does use the secure monitor process 94 at EL3. Within the secure domain 90, a secure world operating system 96 executes at exception level EL1 and one or more trusted applications 98 may execute under control of that operating system 96 at exception level EL0. In this example there is no exception level EL2 in the secure domain 90 because virtualisation is not supported in the secure domain, although it would still be possible to provide this if desired. An example of an architecture for supporting such a secure domain 90 may be the TrustZone® architecture provided by Arm® Limited of Cambridge, UK. Nevertheless it will be appreciated that other techniques could also be used. Some examples could have more than two security states, providing three or more states with different levels of security associated with them. The security state register 66 indicates whether the current domain is the secure domain 90 or the non-secure 92 and this indicates to the MMU 70 or other control units what access permissions to use to govern whether certain data can be accessed or operations are allowed.

Figure 5:
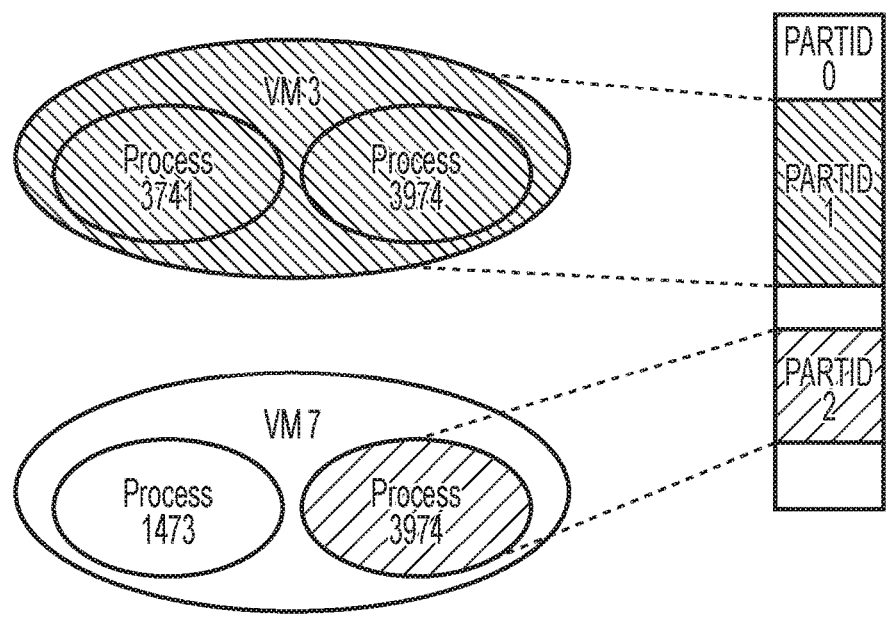
FIG. 5 illustrates an example of allocating partition identifiers to different software execution environments.

Hence, FIG. 4 shows a number of different software execution environments 80, 82, 84, 94, 96, 98 which can be executed on the system. Each of these software execution environments can be allocated a given partition identifier (partition ID or PARTID), or a group of two or more software execution environments may be allocated a common partition ID. In some cases, individual parts of a single processes (e.g. different functions or sub-routines) can be regarded as separate execution environments and allocated separate partition IDs. For example, FIG. 5 shows an example where virtual machine VM 3 and the two applications 3741, 3974 executing under it are all allocated PARTID 1, a particular process 3974 executing under a second virtual machine, VM 7, is allocated PARTID 2, and the VM7 itself and another process 1473 running under it is allocated PARTID 0. It is not necessary to allocate a bespoke partition ID to every software execution environment. A default partition ID may be specified to be used for software execution environments for which no dedicate partition ID has been allocated. The control of which parts of the partition ID space are allocated to each software execution environment is carried out by software at a higher privilege level, for example a hypervisor running at EL2 controls the allocation of partitions to virtual machine operating systems running at EL1. However, in some cases the hypervisor may permit an operating system at a lower privilege level to set its own partition IDs for parts of its own code or for the applications running under it. Also, in some examples the secure world 90 may have a completely separate partition ID space from the normal world 92, controlled by the secure world OS or monitor program EL3.

As shown in FIG. 3, the CPU may include MPAM generation logic 77 for generating the MPAM-related information to be associated with a given memory access transaction. The MPAM-related information may include at least the PARTID, but could also include other information in some examples. The MPAM generation logic 77 may include MPAM register selection logic 78 to select between partition ID registers of the MPAM control registers 68 to determine which register should be used for generating the MPAM-related information, and partition ID virtualisation logic 79 for controlling mapping of virtual partition IDs to physical partition IDs. The MPAM register selection logic 78 and partition ID virtualisation logic 79 is discussed later in more detail with respect to FIGS. 8 and 9 respectively. The MPAM generation logic 77 generates a number of alternative pieces of MPAM-related information, including instruction MPAM-related information (I-MPAM) to be used for instruction fetch accesses, data MPAM-related information (D-MPAM) to be used for data accesses, instruction page table walk MPAM-related information (I-PTVV-MPAM) to be used for page table walk accesses triggered by an instruction fetch, and data page table walk MPAM-related information (D-PTW-MPAM) to be used for data page table walk MPAM-related information. Selection of I-PTW-MPAM and D-PTW-MPAM is discussed in more detail below with respect to FIGS. 16-17.

Figure 6:
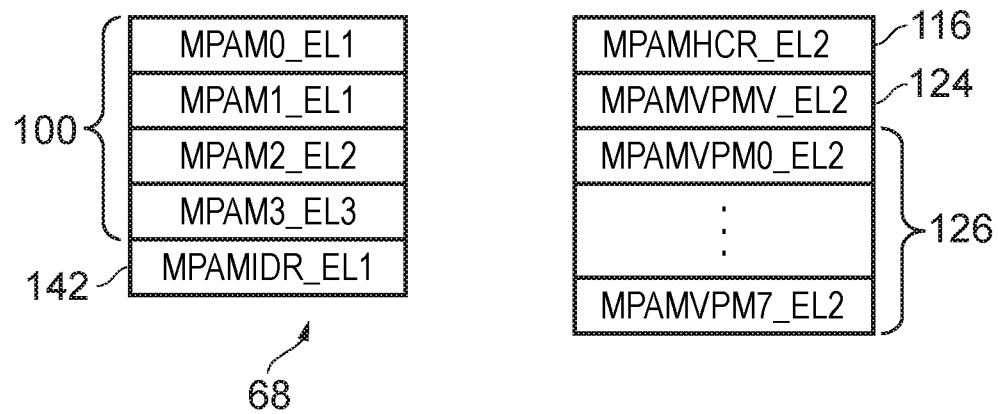
FIG. 6 shows an example of control registers for controlling which partition identifier is specified for a given memory transaction.

FIG. 6 shows an example of the MPAM control registers 68. The MPAM control registers 68 include a number of partition ID registers 100 (also known as MPAM system registers) each corresponding to a respective operating state of the processing circuitry. The MPAM control registers 68 also include a hypervisor control register (HCR), MPAM-HCR_EL2 116, a virtual partition ID valid register (MPAMVPMV_EL2) 124 and a set of virtual partition ID mapping registers 126. In this example there are 8 virtual partition ID mapping registers 126, MPAMVPM0_EL2 to MPAMVPM7_EL2, but it will be appreciated that other implementations could provide a different number.

In this example the partition ID registers 100 include registers MPAM0_EL1 to MPAM3_EL3 corresponding the respective exception levels EL0 to EL3. In this example, the partition ID registers 100 may be shared between secure and non-secure worlds for a given exception level, but another approach could be to provide dedicated partition ID registers for the secure world processing at a given exception level, separate from the partition ID register used for the same exception level in the non-secure world.

Each partition ID register 100 comprises fields for up to three partition IDs as shown in table 1 below:

TABLE 1

| ID Name | Description |
| --- | --- |
| PARTID_D | Partition ID used for data access requests. |
| PARTID_I | Partition ID used for instruction fetch requests. |
| PMG_D | Performance monitoring group ID used for data access requests. |
| PMG_I | Performance monitoring group ID used for instruction fetch requests. |

Table 2 below summarises which partition ID register 100 is used for memory transactions executed in each operating state, and which operating states each partition ID register 100 are controlled from (that is, which operating state can update the information specified by that register):

TABLE 2

| Partition ID register 100 | Controlled From | Controls IDs When Executing In | Notes (explained in more detail below) |
| --- | --- | --- | --- |
| MPAM0_EL1 | EL1, EL2, EL3 | EL0 when HCR.GSTAPP_PLK = 0 | MPAM0 EL1 IDs can be mapped with virtualization option. Can be overridden using control bit, GSTAPP_PLK. |
| MPAM1_EL1 | EL1, EL2, EL3 | EL1 and EL0 when HCR.GSTAPP_PLK = 1 | MPAM1 EL1 IDs can be mapped with virtualization option. Can override MPAM0_EL1. |
| MPAM2_EL2 | EL2, EL3 | EL2 | If EL3 is not implemented, MPAM2 EL2 is controlled from EL2. |
| MPAM3_EL3 | EL3 | EL3 | MPAM3 EL3 is controlled from EL3. |

The naming convention MPAMx_Ely for the partition ID registers indicates that the partition IDs specified in the partition ID register MPAMx_ELy are used for memory transactions issued by the processing circuitry 6 when in operating state ELx and that state ELy is the lowest exception level at which that partition ID register MPAMx_ELy can be accessed. However, when the current exception level is EL0 in the non-secure domain, MPAM0_EL1 can be overridden—when a configuration value GSTAPP_PLK set in a control register (MPAMHCR_EL2 116 described later) is set to 1 the partition IDs in MPAM1_EL1 are used. Hence, the control for EL1 can override the control for EL0 when desired. This can be useful for constraining all applications running under a particular virtual machine to use the same partition ID to avoid needing to update MPAM0_EL1 each time there is a context switch between applications within the same virtual machine. While the configuration parameter GSTAPP_PLK is described as being stored in the MPAM-HCR_EL2 116 control register in this example, it could also be stored in other MPAM control registers 68 (e.g. the partition ID register corresponding to the higher exception level which sets that configuration parameter).

In general, when switching between different processes executed at the same state (e.g. different applications at EL0 or different guest operating systems at EL1), an exception event triggers a switch to a higher exception state where the process running at that state (e.g. the operating system at EL1 or the hypervisor at EL2) then updates the partition IDs in the relevant partition ID register 100 before returning processing to the lower exception state to allow the new process to continue. Hence, the partition IDs associated with a given process may effectively be seen as part of the context information associated with that process, which is saved and restored as part of the architectural state of the processor when switching from or to that process.

However, by providing multiple partition ID registers 100 corresponding to the different operating states of the system, it is not necessary to update the contents of a single partition ID register each time there is a change in operating state at times other than at a context switch, such as when an operating system (OS) traps temporarily to the hypervisor for the hypervisor to carry out some action before returning to the same OS. Such traps to the hypervisor may be fairly common in a virtualised system, e.g. if the hypervisor has to step in to give the OS a different view of physical resources than what is actually provided in hardware. Hence, by providing multiple partition ID registers 100, labelling of memory system transactions with partition IDs automatically follows changes of the exception level or of the secure/non-secure state, so that there is faster performance as there is no need to update the partition IDs each time there is a change in exception level or security state.

Also, while most of the time the control information, such as the partition IDs and any associated configuration information, specified within the partition ID register 100 associated with a given operating state would be set in response to instructions executing at a higher exception level than the exception level associated with that partition ID register 100, sometimes it may be desired for code executing at a given operating state to set its own partition IDs in the corresponding partition ID register. Control flags may be set in the MPAM control registers 68 to control which exception levels are able to write to a given partition ID register 100, and/or to control whether a write to a given partition ID register 100 from a given exception level triggers a trap to a higher exception level which may then be able to decide whether to implement the write requested by the lower exception level. Hence, an attempt to set the partition ID register 100 from within the same exception state when not allowed by a higher exception state may cause an exception event which triggers a switch to that higher exception state. An exception handler at the higher exception state can then decide how the partition ID should be set.

In general, when a memory transaction is generated by the processing circuitry 6, one of the partition ID registers 100 is selected based on the current operating state as specified above. If the memory transaction is for accessing an instruction, the transaction is tagged with a partition ID derived from the PARTID_I field of the selected partition ID register. In some examples, page table walk memory transactions triggered by a miss in the TLB 72 for an instruction access would use the same partition ID as the instruction access. However, other embodiments may enable instruction side page table walk memory transactions to specify a different partition ID to the instruction access itself, as discussed below with respect to FIGS. 16-18. If the memory transaction is for accessing data, then the transaction is tagged with a partition ID derived from the PARTID_D field of the selected partition ID register 100 (and again any page table walk access triggered by the MMU following a data access may either use the same partition ID as the data access itself or could specify a different partition ID to the data access as described further below). Note that regardless of whether the MMU issuing a page table walk access itself supports resource/performance monitoring partitioning based on the partition ID, it may still append the relevant partition identifier to the corresponding memory transaction to allow memory system components in another part of the memory system to perform such partitioning. The PARTID_D and PARTID_I fields of a given partition ID register may be set to the same partition ID or to different partition IDs.

It can be useful to allow separate partition IDs to be defined for the data and instruction accesses for the same software execution environment, so that different resource control parameters can be used for the corresponding instruction and data accesses. An alternative approach would be to have a single partition ID associated with a software execution environment as a whole, but to append an additional bit of 0 or 1 depending on whether the access is for instructions or data, and this would allow the memory system component to select different control parameters for the instruction and data accesses respectively. However, for a given number of sets of control parameters selected based on the partition ID, this approach would mean that there would have to be a 50-50 split of the partition ID space between data and instructions. In practice, it may often be desirable to have more data partitions than instruction partitions, because it can be relatively common for multiple software execution environments to use the same code but execute with different data inputs, and so it can be particularly useful to be able to share a single instruction partition ID among multiple software execution environments while allowing each of those environments to use different data partitions. The approach of appending a 0 or 1 bit to indicate instruction or data accesses would in that circumstance require multiple sets of identical configuration information to be defined at the memory system component for each separate instance of the common code. In contrast, by providing separate instruction and data partition fields in the partition ID register 100, where the instruction and data partition IDs are selected from a common ID space, it is possible to reuse the same partition ID between different software execution environments and to partition the partition ID space between data and instructions as required without constraining this to a fifty-fifty split. Even though some additional storage capacity may be required for two partition ID fields in each partition ID register 100, this approach can save resource at the memory system component since by sharing one partition between the instruction accesses of multiple execution environments, fewer sets of control parameters (and hence less storage) are required at the memory system component.

As well as providing the PARTID, the transaction is also tagged with a performance monitoring partition ID derived from the PMG_D or PMG_I fields of the selected partition ID register 100 (which PMG field is selected depends on whether the transaction is for a data access or an instruction fetch access). This enables memory system components to partition performance monitoring, e.g. by using the performance monitoring ID of the memory transaction as part of the criteria for determining whether a given performance monitor should be updated in response to the memory transaction. In one embodiment, the PMG_D or PMG_I fields may be treated as completely independent of the PARTID_D and PARTID_I fields. In this case, memory system components implementing performance monitoring may determine whether a memory transaction causes an update of a given performance monitor in dependence on the PMG_D or PMG_I identifier only, independent of the PARTID_D or PARTID_I value specified for the same memory transaction. This would provide the advantage that different partitions for instruction/data accesses could nevertheless share the same performance monitoring ID, which would support gathering of combined performance statistics for a number of processes which require different instruction/data access configurations at a memory system component. Hence, by specifying a performance monitoring group ID separate from the partition IDs used for controlling resource allocation at the memory system component, this allows multiple different software execution environments to be tracked using a common set of performance counters even if their resources are being allocated separately.

Alternatively, another approach may be to interpret the PMG_D or PMG_I field as a suffix to be appended to the corresponding partition ID derived from the PARTID_D or PARTID_I fields. With this approach, when a transaction is issued to memory, the transaction is appended with two IDs, one based on the selected PARTID_I or PARTID_D fields, and another based on the PMG_I or PMG_D field, but the PMG_I or PMG_D field is regarded as a property of the PARTID rather than an ID in its own right. Hence, memory system components can in this case perform resource partitioning based on a first partition ID derived from PARTID_I or PARTID_D, but perform performance monitoring partitioning based on the combination of the first partition ID and a second partition ID derived from PMG_I or PMG_D. With this approach, it is no longer possible for different memory resource partition IDs to share the same performance monitoring ID, but the advantage is that shorter PMG fields can be used to save hardware cost as the instruction/data PMG fields do not need to distinguish all possible performance monitoring partitions—only the partitions that share the same instruction/data resource partition ID are distinguished by the instruction/data PMG fields. For example this can allow a 1 or 2-bit PMG field to be used rather than a larger field, which saves cost not only in the control registers 68 but also in the wires which carry the memory transactions through the memory system. While the above example provides separate PMG suffix fields PMG_D and PMG_I corresponding to the PARTID_D and PARTID_I fields respectively, to allow separate performance monitoring group properties to be defined for data and instruction accesses respectively, another approach could be to provide a single PMG field shared between data and instruction accesses.

Either way, the ability to define multiple performance monitoring partitions per data/instruction partition ID can be useful. On the other hand, it will be appreciated that other examples could omit the separate performance monitoring ID field altogether, and instead use the same partition ID to control both the management of resources and the performance monitoring.

Figure 7A:
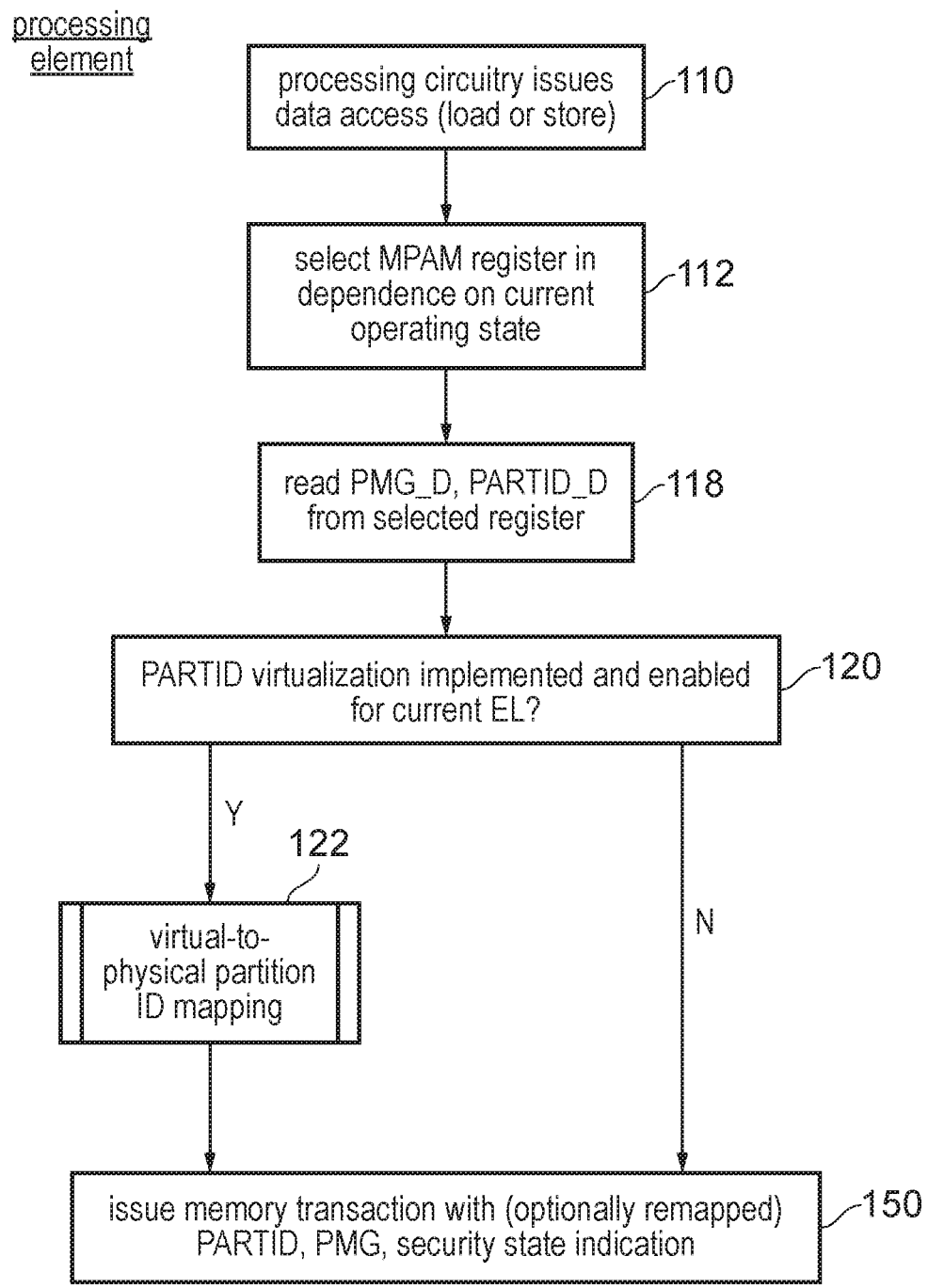
FIG. 7A is a flow diagram illustrating a method of issuing a data access memory transaction from a master device.

FIG. 7A is a flow diagram illustrating a method of controlling issuing of a data access memory transaction from a processing element such as a CPU 6, GPU or other master acting as a source of memory transactions, in particular controlling which partition ID is specified with the memory transaction. The approach shown in FIG. 7A can be used at least for data access memory transactions issued by the load/store unit 50 (for data-side page table walk memory transactions triggered by such data access memory transactions, the selection of the MPAM register at step 112 can be handled in a different way as discussed further below).

At step 110 the processing element issues a data access (load/store) memory access transaction, e.g. in response to a load/store instruction executed at the execute stage 48.

Figure 8:
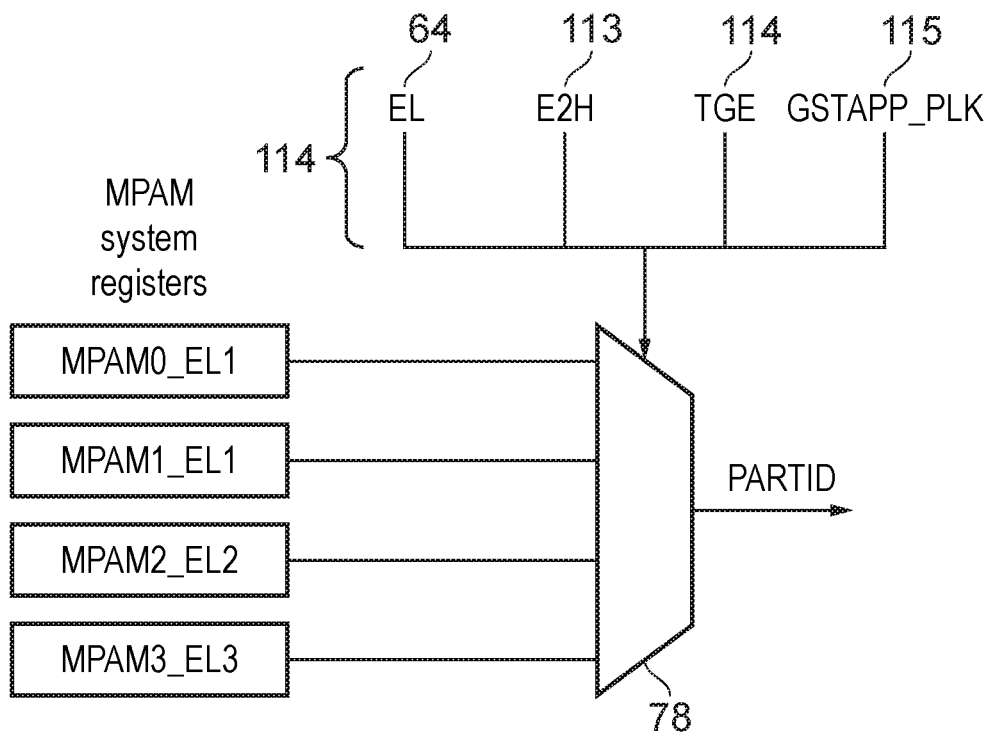
FIG. 8 schematically illustrates selection of a partition identifier register in dependence on a current operating state of the processing circuitry.

At step 112 the MPAM register selection logic 78 of the processing element selects one of the partition ID registers 100 in dependence on its current operating state 64 and MPAM control information specified in the MPAM control registers 68. FIG. 8 schematically illustrates an example of the MPAM register selection logic 78 selecting which one of the partition ID registers 100 should be used to generate the partition ID for the current memory transaction, in dependence on at least the current exception level 64 and the following control parameters specified in the hypervisor control register MPAMHCR_EL2 116:

a parameter E2H 113 which is set to 1 for Type-2 hypervisors operating at EL2. When E2H is set to 1, instructions for accessing certain EL1 control registers return corresponding EL2 versions of the control register state, so that an unmodified operating system designed to operate at EL1 can function as a Type-2 hypervisor operating at EL2.

a parameter TGE 114 which when TGE=1 indicates that types of exceptions arising at EL0 that would normally be routed to EL1 (if TGE=0) should instead be routed to EL2, so that a Type-2 hypervisor operating at EL2 can manage applications at EL0 without an intervening operating system at EL1; and a parameter GSTAPP_PLK 115 stored in MPAM-HCR_EL2 116, which defines whether processes operating at EL0 should use the MPAM0_EL1 partition IDs or the MPAM1_EL1 partition IDs The criteria for selecting which register 100 is the selected register are as follows:

MPAM0_EL1 is selected if any of the following is true:
  the current exception level 64 is EL0, and GSTAPP_PLK=0;
  or
  if the current exception level 64 is EL0 and both E2H=1 and TGE=1.

Hence, MPAM0_EL1 is selected if EL0 && ((E2H && TGE) ||!GSTAPP_PLK).

MPAM1_EL1 is selected if any of the following is true:
  the current exception level 64 is EL1;
  or
  the current exception level 64 is EL0 and GSTAPP_PLK=1 and at least one of E2H and TGE=0.

Hence, MPAM1_EL1 is selected if EL1 && (EL0 && GSTAPP_PLK && !(E2H && TGE)).

MPAM2_EL2 is selected if the current exception level 64 is EL2.

MPAM3_EL3 is selected if the current exception level 64 is EL3.

The provision of a GSTAPP_PLK configuration parameter is optional, and in systems which do not support this feature, MPAM0_EL1 is selected when the current exception level is EL0, not MPAM1_EL1. Similarly, support for type-2 hypervisors may be optional, and so other implementations may not have the E2H/TGE controls.

Also, in an embodiment as mentioned above which has a separate secure partition ID register MPAM1_EL1_S, the selection would also depend on the current security state, with register MPAM1_EL1_S being selected when processing at EL0 or EL1 in the secure domain, and otherwise the selection would be as listed above.

At step 118, as the current transaction is a data access transaction, the PMG_D and PARTID_D fields are read from the register 100 selected at step 112.

At step 120, the processing element determines whether virtualization is implemented and enabled for the read partition IDs in the current operating state. For EL2 and EL3, there is no need to perform virtualisation. For EL0 and EL1, whether virtualisation is enabled depends on information specified in the hypervisor control register MPAM-HCR_EL2 116, which includes virtualisation enable flags EL0_VPMEN and EL1_VPMEN specifying whether virtualisation is enabled for EL0 and EL1 respectively. If virtualisation is enabled for EL0 and the MPAM0_EL1 register was selected at step 112, or if virtualisation is enabled for EL1 and the MPAM1_EL1 register was selected at step 112, then at step 122 at least one of the partition IDs read at step 116 or 118 is mapped to a physical partition ID appended to the memory transaction to be issued to the memory system. Otherwise step 122 is omitted.

Figure 9:
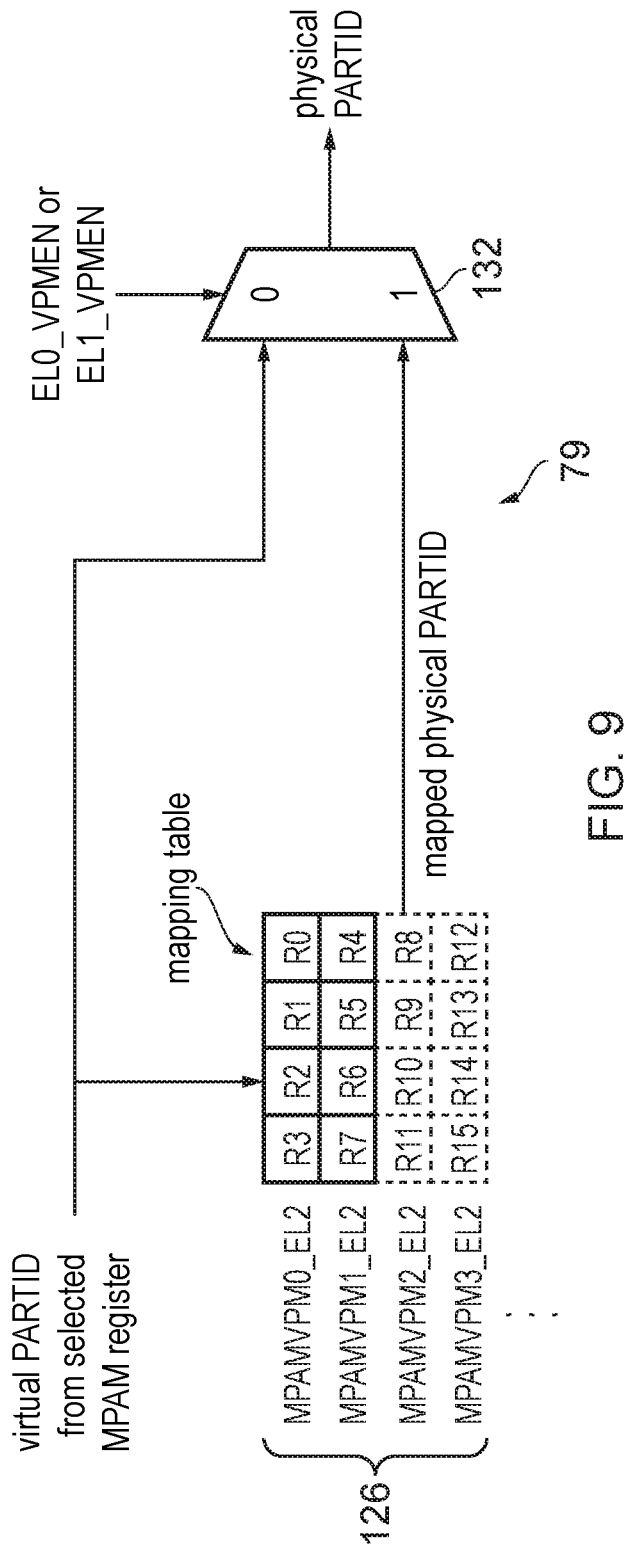
FIG. 9 schematically illustrates an example of mapping virtual partition identifiers to physical partition identifiers.

An example of virtualised mapping of partition IDs is illustrated in FIG. 9. The global partition ID space may be controlled by the hypervisor at EL2. In this example, virtualisation is applied only for PARTIDs (memory resource partition IDs), but is not applied for PMGs (performance monitoring partition IDs). However, other embodiments could also provide virtualisation for performance monitoring partition IDs, for example.

The hypervisor may restrict a guest operating system executing at EL1 to use only a small range of partition IDs (e.g. starting from zero) and the mapping registers 126 define a mapping table which provides a number of mapping entries for mapping the virtual partition IDs used by that guest operating system to physical partition IDs within the global ID space. Each mapping register may store mapping entries for one or more virtual IDs (depending on the relative size of the register compared to the width of a single partition ID). The mapping table is indexed based on the virtual partition ID used by the operating system and returns a corresponding physical partition ID in the global ID space. This enables each guest operating system to set IDs for its own applications unaware of the fact that it is virtualised and executing alongside other guest operating systems which may be using similar ID values. The respective guest operating systems may have their conflicting virtual IDs mapped to different global physical partition IDs by the mapping set up in the mapping table by the hypervisor.

FIG. 9 shows an example of the PARTID virtualisation logic 79 shown in FIG. 3, which is invoked when the current exception level is EL0 or EL1. The PARTID from the selected partition ID register 100 (selected by the register selection logic 78 as discussed above) is a virtual partition ID and is used to select a corresponding mapping entry from the mapping registers 126. In this example each mapping register 126 includes four mapping entries, so two bits of the virtual partition ID select the particular mapping entry within a mapping register 126 and the remaining bits select which mapping register 126 is selected. However, other examples may have different numbers of entries per register. The physical partition ID is read from the selected mapping entry and provided to multiplexer 132, which selects between the original virtual partition ID read from the selected partition ID register 100 and the corresponding remapped physical partition ID, in dependence on the virtualisation enable parameter EL0_VPMEN (if the selected register 100 was MPAM0_EL1) or EL1_VPMEN (if the selected register 100 was MPAM1_EL1). When virtualisation is not enabled, the original virtual partition ID is output as the physical PARTID, while when virtualisation is enabled the physical partition ID from the mapping registers 126 is used.

Each mapping entry is associated with a corresponding valid bit in the mapping valid register MPAMVPMV_EL2 124. The valid bit for a given mapping entry specifies whether that virtual-to-physical partition ID mapping is valid. When a processing element issues a memory transaction specifying an invalid virtual partition ID, this may trigger the mapping logic to select an alternative valid partition ID instead. Hence, it is not necessary for the hypervisor to allocate virtual-to-physical partition ID mappings for all possible virtual PARTIDs. When receiving an invalid virtual partition ID, the mapping circuitry can simply uses an "in case of error" value for the physical partition ID, which is passed to the memory system component along with the corresponding memory request and treated as a valid partition ID. The predetermined physical partition ID could be a certain "default" value of the partition ID, e.g. the same default partition ID used for software execution environments which do not have a bespoke partition ID allocated to them. For example the predetermined physical partition ID could be zero. Alternatively, a control register (PARTID_ON_ERROR) may define the particular value of the physical partition ID to be used as the predetermined physical partition ID in case of error. An alternative approach would be to trap to the hypervisor at EL2 when an invalid virtual partition ID is received, but this may have a greater performance impact.

While FIG. 6 shows an example where the valid bits are stored in a separate register 124 from the mapping registers 126, in other implementations each mapping entry could itself include a valid bit, so that the valid bits are stored alongside the corresponding physical partition IDs in the mapping registers 126. In this case, the remap valid register 124 can be omitted. Hence, in general each mapping entry may be associated with a valid bit, but the location in which the valid bit is stored may vary depending on the implementation choice.

While FIG. 7A for ease of understanding shows a sequential process with step 122 as a conditional step, in practice as shown in FIG. 9 the physical partition ID could be calculated for each memory transaction, and both the remapped and non-remapped versions of the partition ID may be provided to a multiplexer 132 which selects between them based on the relevant enable parameter. This can be faster than waiting until it has been determined whether virtualisation is enabled before looking up the physical partition ID.

Figure 10:
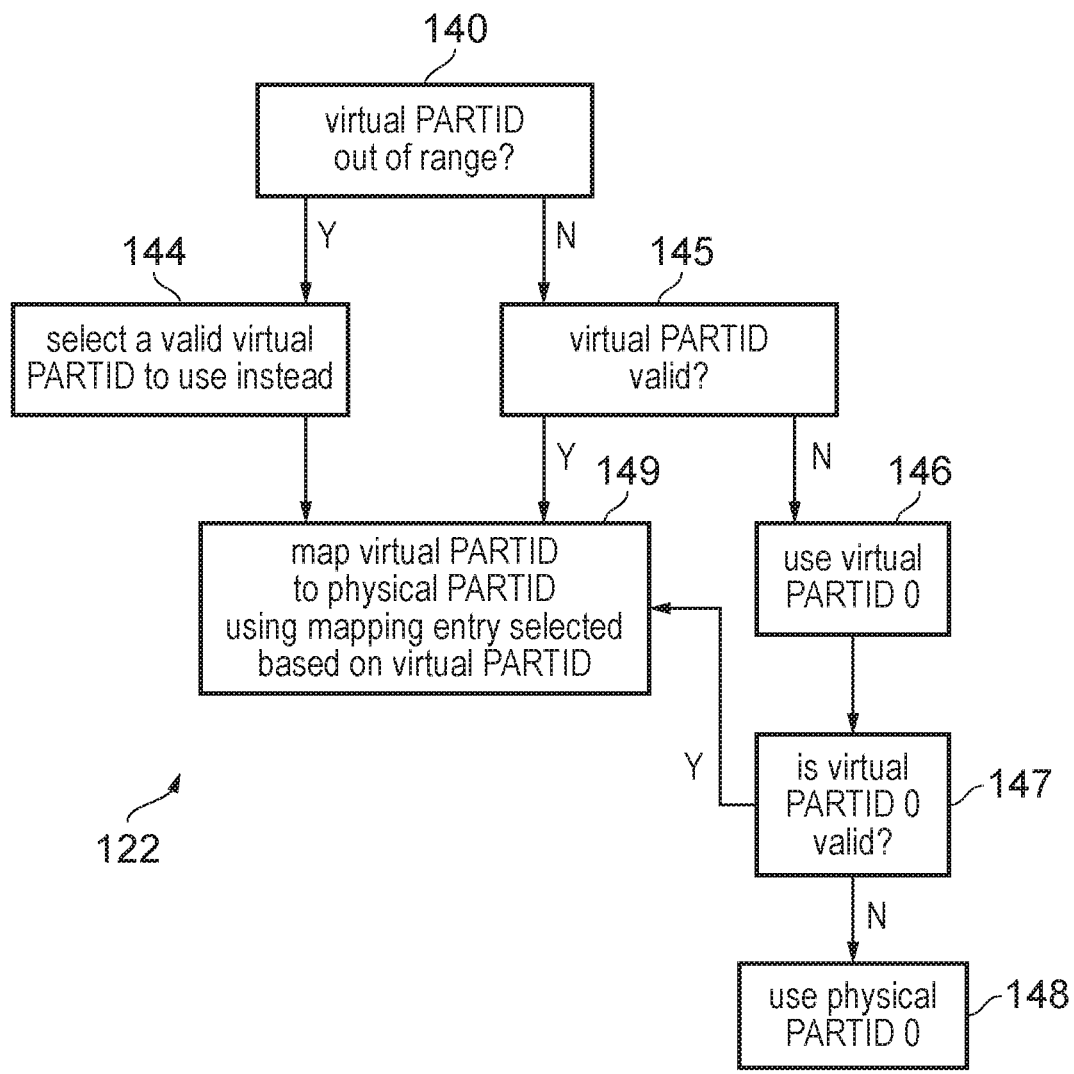
FIG. 10 is a flow diagram illustrating a method of mapping a virtual partition identifier to a physical partition identifier.

FIG. 10 is a flow diagram illustrating step 122 in more detail. At step 140 it is determined whether the virtual partition ID being remapped is out of range. For example, the hypervisor control register 116 or another of the MPAM control registers 68 (e.g. a discovery register MPAMIDR_EL1 142 for identifying to software what capabilities are provided in hardware, which is discussed in more detail below) may specify the maximum ID value permitted to be specified by the current context. For example the hypervisor may define the mappable range of partition IDs which can be used by the operating system executing under it, for example based on how many mapping registers 126 are provided in hardware. If the partition ID being remapped (i.e. the ID read from the register selected at step 112 of Figure 7A) is out of range, then at step 144 a valid virtual PARTID is selected to be used instead, and the method proceeds to step 149 discussed below. Which particular virtual PARTID is used could be arbitrary, e.g. the lowest valid PARTID.

If the virtual partition ID is within the permitted range, then at step 145 it is determined whether the corresponding mapping entry is valid, e.g. based on the corresponding valid bit in the mapping valid register 124. If the virtual partition ID is valid, the method proceeds to step 149 described below. If the virtual partition ID is not valid, then at step 146 virtual PARTID 0 is selected (that is, the virtual PARTID which is equal to a numeric value of 0). At step 147, it is checked whether virtual PARTID 0 is valid, and if so the method continues to step 149. If virtual PARTID 0 is invalid, then at step 148 physical PARTID 0 (the physical PARTID with all bits equal to 0) is used as the physical PARTID to be appended to the memory transaction.

At step 149 (which may follow any of steps 144, 145 or 147), the selected virtual PARTID is mapped to a physical ID specified in the mapping entry corresponding to the virtual PARTID, and the resulting physical PARTID is used to tag the memory transaction.

In another example, it would be possible to proceed directly from step 145 to step 148 in the event that the received virtual PARTID is invalid.

Figure 11:
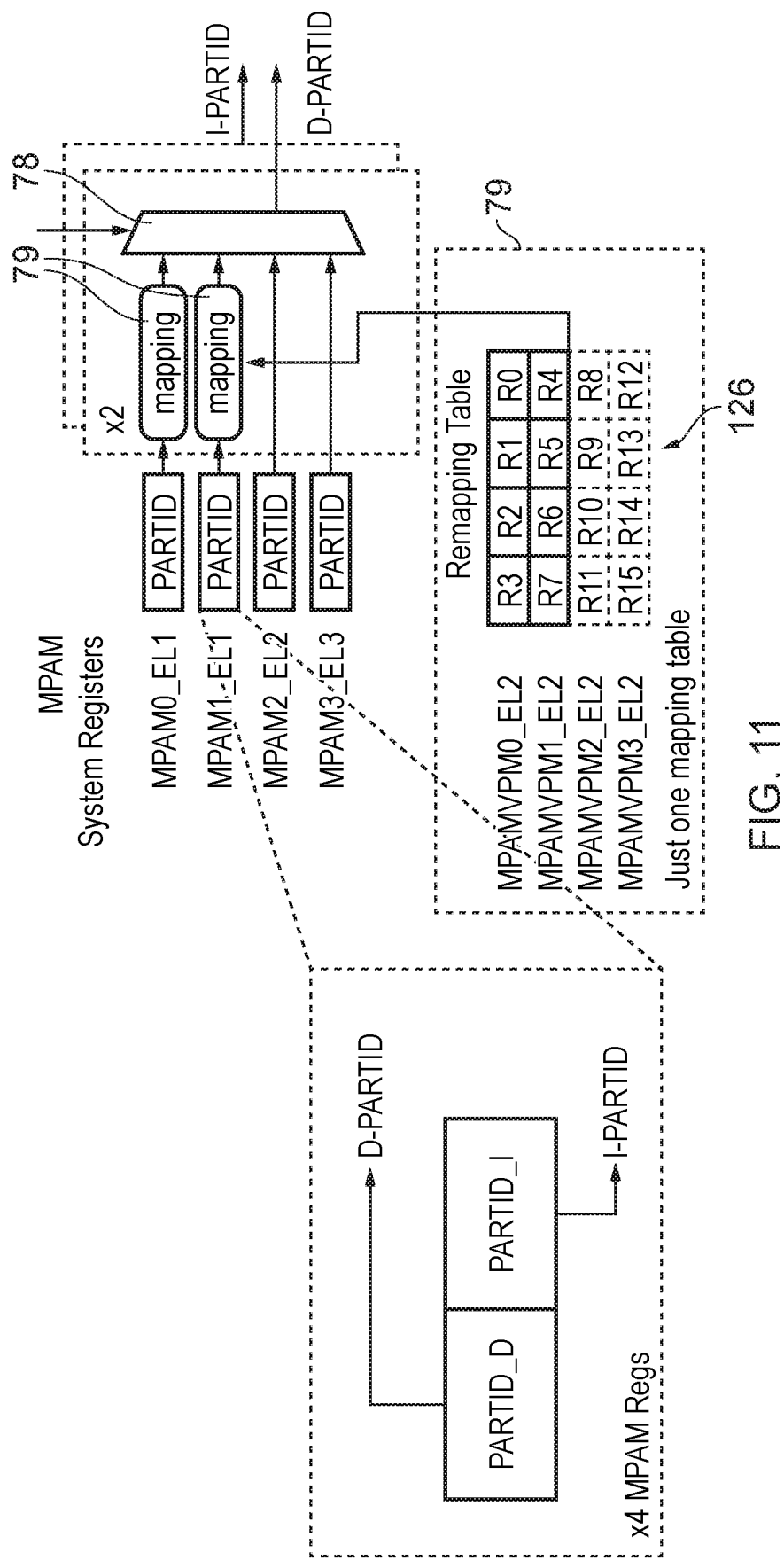
FIG. 11 schematically illustrates an example of generating separate partition identifiers for instruction and data memory transactions.

As shown in FIG. 11, while PARTID_I and PARTID_D are specified separately in the partition ID register 100, the mapping circuitry 130 may use a common mapping table 126 for both types of ID. Hence, it is not necessary to provide separate sets of mapping registers 126, 128 for instruction and data accesses.

In summary, by providing mapping hardware (mapping registers 126 and mapping circuitry 79) for mapping a smaller space of virtual IDs onto physical IDs in the global ID space used by the memory system components, this allows multiple guest operating systems to co-exist while using conflicting partition IDs, while improving performance as there is no need for each memory transaction to trap to the hypervisor for mapping the partition IDs.

At step 150 of FIG. 7A, the memory transaction is issued specifying the PMG and PARTID (either in the original form read from the selected partition ID register, or following mapping at step 122), as well as a secure state indication indicating whether the security state in which the transaction was issued. The secure state indication is included so that the partition IDs allocated in the secure domain may use a completely separate partition ID space from the partition IDs allocated for the less secure domain (rather than allocating some partition IDs from a single ID space to the secure processes, which could allow non-secure processes to infer information about the secure processes that are provided). By providing complete separation between the secure and less secure worlds, security can be improved. The security indication provided with the transaction indicates which security state the transaction is issued from.

This security indication may be provided separately from any address-based security indication indicating whether the target address of the transaction is secure or non-secure. That is, regions of the memory address space may be designated as secure or non-secure, with the secure regions being accessible only from the secure domain while the non-secure regions are accessible in both the secure and non-secure domains. Such an address-based security indication may be included with transactions in case the memory system includes further control structures, such as a system MMU, which control access in dependence on whether the address is in a secure or non-secure region. However, since the secure domain can access both non-secure and secure regions of the address space, this address-based security indication is not enough to identify whether the process which issued the transaction was secure or non-secure. Therefore, the memory transactions may separately identify both the domain from which the transaction is issued (MPAM_NS) and the security state associated with the target address (NS):

| MPAM_NS | NS | Meaning |
|---|---|---|
| 0 | 0 | Secure: a secure partition ID (access from secure state) used with access to a secure location. |
| 0 | 1 | Cross-state: a secure partition ID (access from secure state) used with access to a non-secure location. |
| 1 | 0 | Illegal as accesses from the non-secure state are not allowed to access a secure location. |
| 1 | 1 | Non-secure: a non-secure partition ID (access from non-secure state) used with access to a non-secure location. |

On receiving a memory transaction, the memory system component can then use the MPAM_NS security indication to select between different sets of parameters for the secure and non-secure domains respectively, to avoid sharing control parameters across domains, which could pose security risks if non-secure code could set performance control parameters or access performance monitoring data for secure code.

Figure 7B:
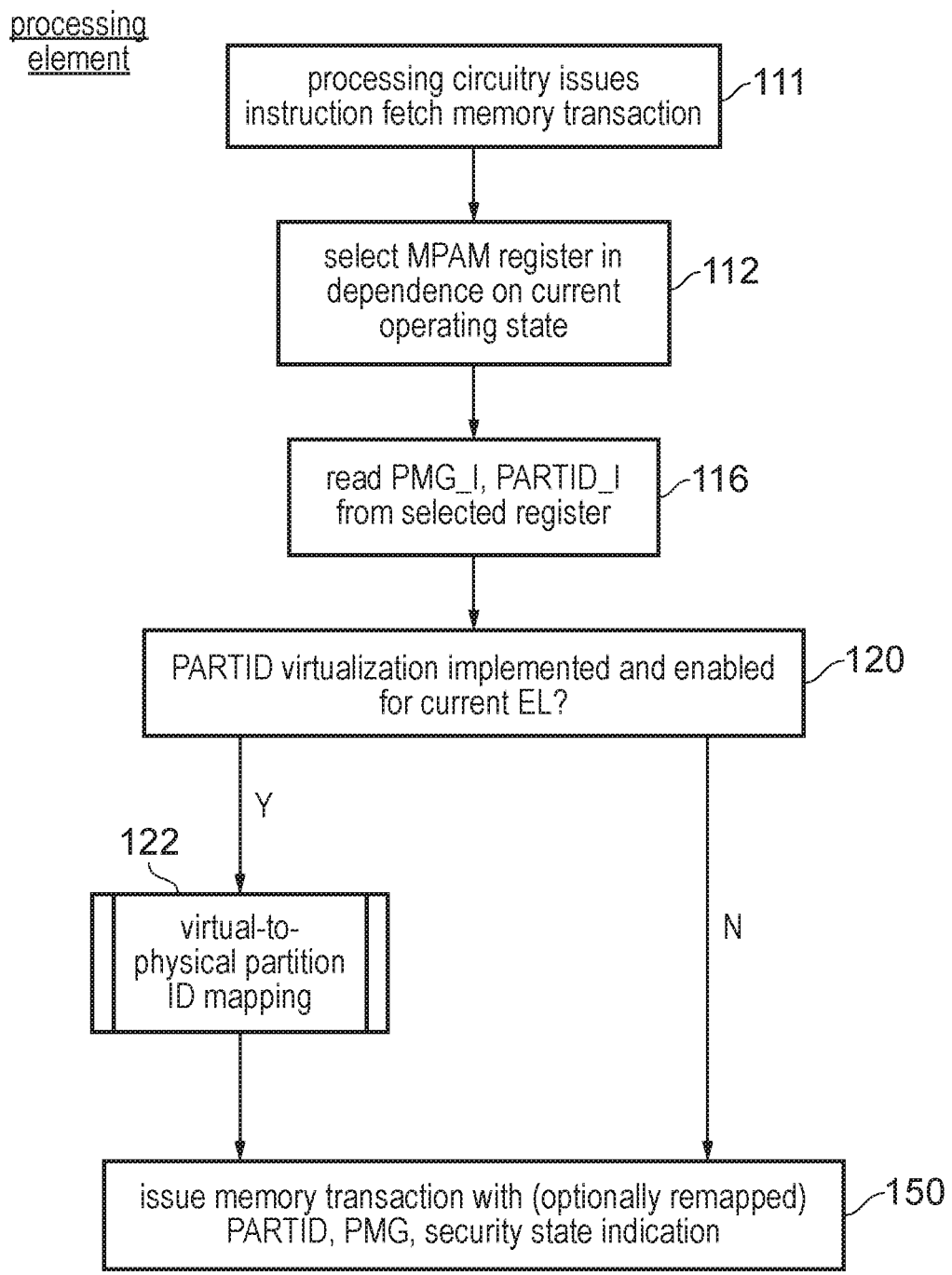
FIG. 7B is a flow diagram illustrating a method of issuing an instruction fetch memory transaction from a master device.

FIG. 7B is a flow diagram illustrating a method of controlling issuing of an instruction fetch access memory transaction from a processing element such as a CPU 6, GPU or other master, in particular controlling which partition ID is specified with the memory transaction. The approach shown in FIG. 7B can be used at least for instruction fetch memory transactions issued by the fetch stage 40. For instruction-side page table walk memory transactions triggered by such instruction fetch memory transactions, the selection of the MPAM register at step 112 can be handled in a different way as discussed further below).

At step 111 of FIG. 7B, the processing circuitry issues an instruction fetch memory transaction, requesting fetching of an instruction for a given address. The instruction fetch request could be made by the fetch stage 40, when actually needing the instruction to be fetched for execution, or some implementations may have pre-fetch circuitry to pre-fetch instructions into the instruction cache 10 ahead of the time when they are actually needed for execution, and so the pre-fetch circuitry could also generate instruction fetch memory transactions.

Step 112 of FIG. 7B is the same as shown in FIG. 7A for data accesses, selecting one of the MPAM partition ID registers 100 based on current operating state (and other control parameters) as discussed above.

At step 116 of FIG. 7B, the PMG_I and PARTID_I fields of the selected partition ID register 100 are read.

Steps 120, 122 and 150 of FIG. 7B are the same as the corresponding steps of FIG. 7A, except that they are applied to the PMG_I/PARTID_I values read at step 116 instead of PMG_D and PARTID_D values.

Returning to FIG. 6, the discovery register MPAMIDR_EL1 142 identifies various capability parameters which identify hardware capabilities of the corresponding processing element (PE). This allows software to query what MPAM resources are provided in a given hardware implementation, so that the same code can be executed across multiple different hardware platforms. For example, the discovery register 142 may specify whether certain MPAM features (e.g. virtualisation, or separate secure/non-secure ID spaces) are provided at all, or what size of resource is provided (e.g. the number of bits in the partition IDs, or the number of mapping registers 126). For example, the discovery register 142 may specify:

PARTID_MAX: the maximum partition ID supported by the hardware implementation for the PE;

HAS_HCR: whether the virtualization functionality is provided (and hence whether the hypervisor control register 116, remap valid register 124, mapping registers 126 and mapping circuitry 79 is provided)

VPMR_MAX: the maximum virtual partition ID supported by the hardware implementation for the PE when virtualisation is implemented;

PMG_MAX: the maximum PMG value supported by the hardware implementation for the PE;

The discovery register 142 may be readable from any exception state other than EL0, but is read only—the discovery register 142 cannot be written to since it defines parameters which are inherent to the particular hardware implementation. For example the discovery register 142 may be hardwired during manufacture of the device.

When virtualisation is supported, it may be desirable to prevent the operating system at EL1 from reading the discovery register 142 directly, since the actual values of PARTID_MAX may be larger than the range of partition IDs which the hypervisor has permitted the operating system to use. Therefore, instructions executed at EL1 which attempt to access the discovery register 142 (or at least attempt to access the PARTID_MAX field which define the maximum partition ID allowed to be specified for memory transactions) may trigger an exception, which traps to the hypervisor which can then provide a different value (e.g. VPMR_MAX) in place of the maximum value to emulate the number of partition IDs that are visible to the operating system. A configuration parameter TRAP_MPAMIDR_EL1 could control whether such accesses to the discovery register 142 from EL1 are trapped to EL2. By setting this configuration parameter, the hypervisor at EL2 or secure monitor at EL3 can control whether the guest OS at EL1 can access the discovery register (IDR) 142 directly or whether the hypervisor must step in. Providing the flexibility to select whether IDR accesses trap to EL2 is useful to improve performance in cases when it is appropriate for the OS to access the IDR directly by avoiding unnecessary traps to EL2—e.g. when virtualisation is disabled.

While virtualisation is discussed above in the context of EL2 setting virtual to physical ID mappings for use by EL1 or EL0, in general this technique could be used for any pair of software execution environments of different privilege levels so that the higher privilege level environment can control mapping of virtual partition IDs to physical partition IDs for transactions issued by the lower privilege software execution environment. Also, unless otherwise specified, the techniques discussed above for partition IDs can also be used for performance monitoring groups in some embodiments, although this is not essential. Hence the term partition identifier can be interpreted as encompassing a performance monitoring group identifier unless otherwise specified.

The partition ID and performance monitoring group appended to a given memory transaction, as well as the security state indication specifying the security state from which the transaction was issued, flow with the memory transaction throughout the memory system. Hence, nodes of the memory system (e.g. an interconnect) which pass memory transactions on to other components of the memory system provide the outgoing memory transactions with the same partition ID, performance monitoring group and security state indication as the corresponding request received at such nodes. For caches within the memory system, these have the behaviour of sometimes generating a response to the request if there is a cache hit, and other times passing it on to a further part of the memory system if there is a cache miss. They may also sometimes allocate new entries based on the request. When allocating new entries, the cache may store the partition ID, performance monitoring group and security indication of request which caused the allocation, alongside the cached data itself. When data is written back to a further cache or memory, the write back transaction is generated specifying the partition ID, performance monitoring group and security indication associated with the evicted data in the cache, rather than the IDs associated with the request which triggered the eviction. This allows resource allocation or performance monitoring for writebacks to be controlled/monitored according to the parameters specific to the software execution environment which allocated the corresponding data to the cache.

Note that not all of the memory system components (caches, interconnects, memory controllers, memory devices, or memory management units for example) may support partitioning. Components which do not support partitioning may control resource allocation or monitor performance in a common manner for all software execution environments. Nevertheless, outgoing requests are still appended with partition IDs in the same way as discussed above so that downstream memory system components which do support partitioning can use the partition IDs to select the appropriate set of parameters. Hence, regardless of whether the system designer actually chooses to use the partition IDs at any given memory system component, the processing element architecture and partition ID routing scheme discussed above provides the flexibility to support a range of implementations which implement partitioning at different points of the memory system. However, for such memory system components which do respond to the partition ID or the performance monitoring group ID, these can control resource allocation or contention management, or performance monitoring, based on the partition ID.

Performance monitors work differently from the resource partitioning controls. Performance monitors measure, count or calculate performance metrics based on filters programmed into the monitor. The filter parameters may include partition ID and performance monitoring group (or performance monitoring group but not partition ID). For example, a performance monitor that counts bytes transferred to memory might filter the measurements to only count reads with partition ID of 5 and performance monitoring group of 2. Hence, performance measurements can be collected for different software execution environments, or different groups of software execution environments, that share the same partition ID and performance monitoring group.

On the other hand, for system components which support resource partitioning, the memory system component selects a set of memory system component parameters based on the partition ID. The memory system component parameters may be resource control parameters which are used to control allocation of memory system resources (such as bandwidth, cache capacity, etc.) or contention for those resources (e.g. the selected memory system component parameters may define the priority set for transactions associated with the corresponding partition ID).

Figure 12:
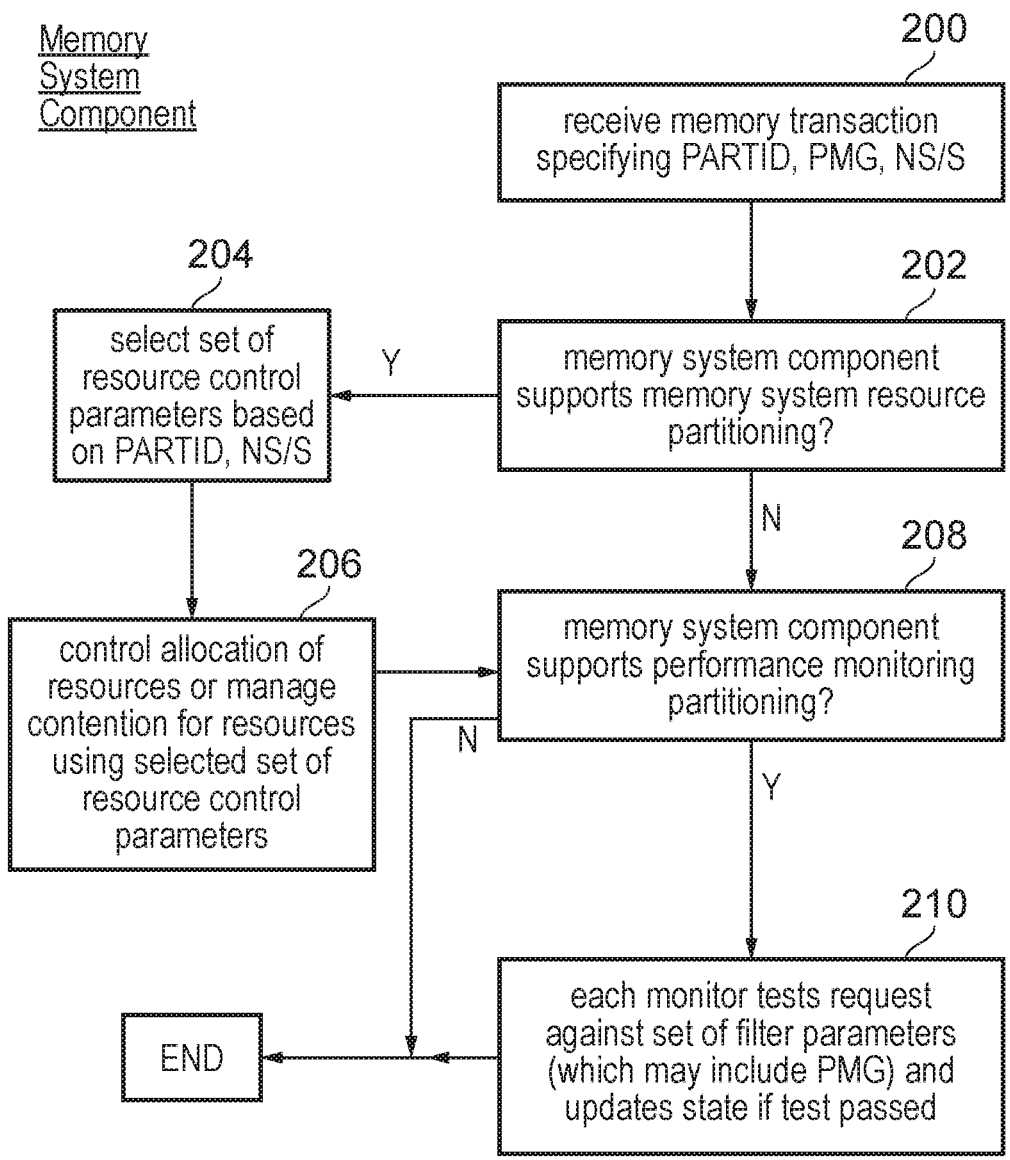
FIG. 12 is a flow diagram illustrating a method of responding to a memory transaction at a memory system component.

FIG. 12 shows a method for controlling the operation of the memory system component based on the partition ID. At step 200 the memory system component receives a memory transaction which specifies a partition ID, performance monitoring group and a security state indication as discussed above. If the memory system component supports memory system resource partitioning (step 202), then at step 204 a set of resource control parameters is selected based on the partition ID and the security state. The performance monitoring group is not considered at this step. At step 206, allocation of resources is controlled using the selected set of resource control parameters, or contention for those resources is managed using the selected set of resource parameters. If memory system resource partitioning is not supported then steps 204 and 206 are omitted.

If the memory system component supports performance monitoring partitioning by performance monitoring group (step 208) then at step 210 each of the performance monitors implemented in the component tests the request against its filter parameters (which may include tests to be applied to the PMG field and partition ID field). Each monitor that has its filter parameters met updates its internal state according the measurement, count or calculation that monitor is designed to make. Step 210 is omitted for memory system components which do not support performance monitoring partitioning. As explained above, in some embodiments both the partition ID field and PMG field may be included in the filter parameters (so that the PMG field further limits the partition ID field). Alternatively, PMG could be interpreted as an independent ID separate from the partition ID field, in which case the filter parameters may consider PMG but not partition ID.

Each memory system component which supports resource monitoring partitioning may have a set of parameter registers which store different sets of memory system component parameters, which are selected based on the partition ID. The control parameters for a partitioning control are logically an array of control parameters indexed by partition ID. The interface for setting control parameters could be arranged as an array of memory mapped registers, or could be arranged with a selector register and only a single configuration register per control parameter. In this latter case, the configuration software first stores a partition ID to configure into the selector register and then stores the desired control parameters in to the one or more control parameter configuration registers.

Figure 13:
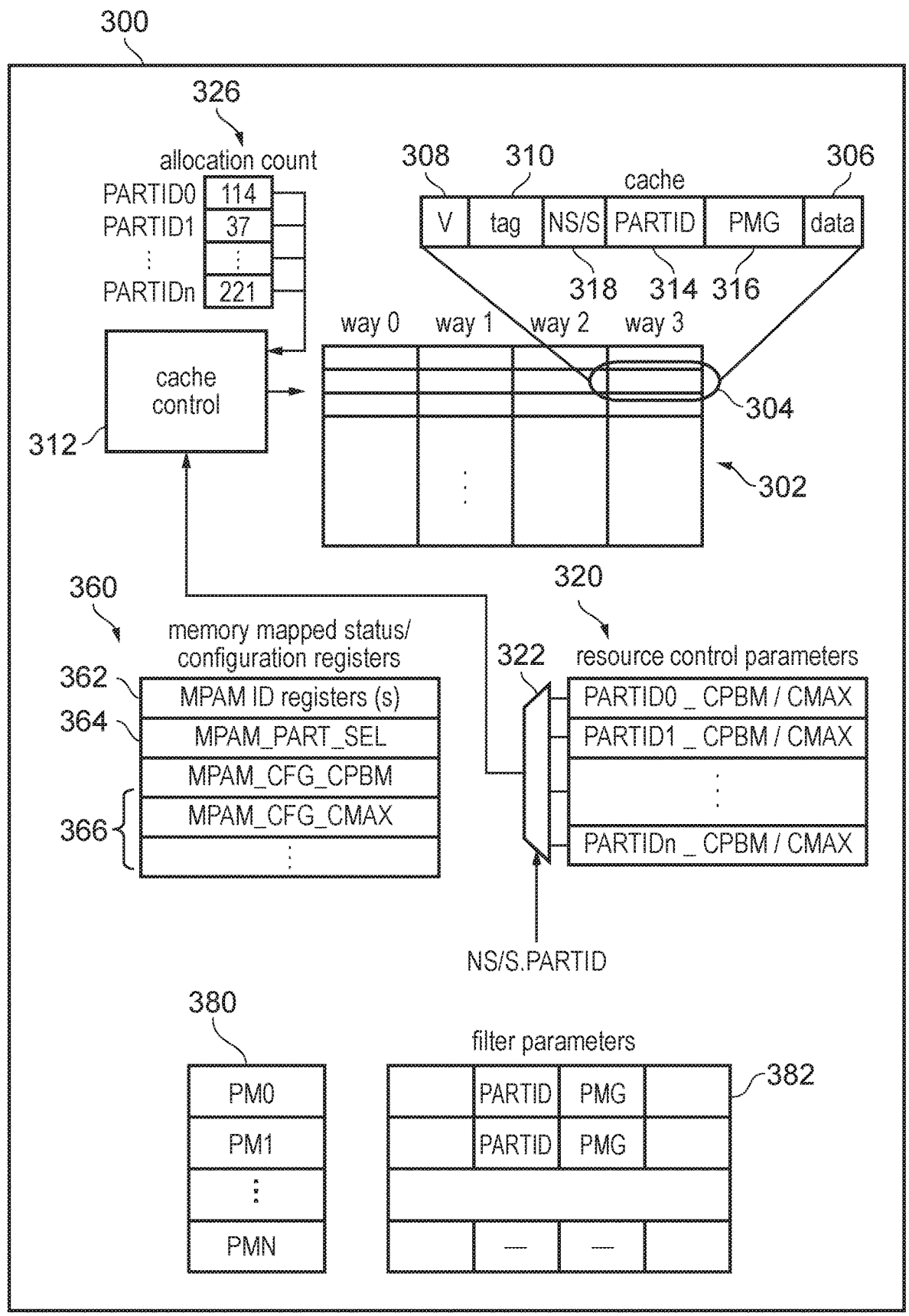
FIG. 13 shows an example of a cache which controls allocation of cache resource in dependence on the partition identifier and/or updates performance monitoring data selected based on a partition identifier.

FIG. 13 shows an example of a cache 300, which is one example of a memory system component. The cache 300 could be a cache for caching instructions or data, such as the level 1 data cache 8, level 1 instruction cache 10 or level 2 cache 12 of a given processing element 6, the cluster cache 16, or system cache 20. The cache 300 could also be a cache for address translation, such as the TLB 72 or page walk cache 74 in the MMU 70. While FIG. 3 shows an example where the MMU 70 is provided within a given processor core, it is also possible to provide system MMUs further down in the memory system, e.g. within the SoC interconnect 18.

The cache 300 has cache storage (cache RAM) 302 for storing the information to be cached. The cache RAM 302 has a certain number of storage entries 304. As shown in FIG. 13, each entry may store:

- the cached data 306 (which may be any cached information—encompassing not just data values but also instructions or address translation data depending on the type of cache),
- a valid bit 308 specifying whether the corresponding data in the entry is valid,
- a tag field 310 indicating a portion of the address associated with the cached data
- the partition ID 314 of the memory transaction that allocated the data into the cache
- the performance monitoring group ID 316 of the allocating memory transaction
- the security state indication 318 of the allocating memory transaction (which indicates which security state that memory transaction was issued from);
- other information that the system design may need to keep for each cache line, for example coherence state or address space indicator (ASI).

On evictions of data from the cache, the ID fields 314, 316, 318 are used to derive the partition ID, performance monitoring group ID and security state indication for the write back transaction. Although not illustrated in FIG. 13, each cache entry may also store coherency information specifying a coherency state of the cached data (e.g. whether the data is clean or dirty for determining whether a writeback is required), and/or victim selection data for selecting a victim cache line when an eviction is required (e.g. data for tracking which entries were least recently used).

Allocation of data to the cache may be controlled in accordance with any known cache organization, including direct-mapped, set-associative or fully associative. The example in FIG. 13 shows a set-associative organization scheme with 4 ways, but it will be appreciated this is just one example. Lookups to the cache are performed independently of the partition ID associated with the corresponding memory transaction. Hence, when a memory transaction specifying a given partition ID is received, the transaction can hit against any data within the indexed cache entries, without regard to the partition ID 314, non-secure ID indicator 318 and performance monitoring group 316 stored in cache entries. Therefore, the partitioning of performance resources and/or performance monitoring does not prevent different software processes sharing access to cached data.

On the other hand, when allocating data to the cache, a cache controller 312 controls allocation in dependence on a set of resource control parameters which is selected based on the security state and the partition ID of the corresponding memory transaction. The cache has a set of resource control parameter registers 320 as mentioned above, each register 320 storing the resource control parameters for a corresponding software execution environment. A selector 322 selects one of the registers based on the partition ID and the security state of the incoming memory transaction which requires allocation of data to the cache. The parameters stored in the selected register are used to control whether, and how, data is allocated to the cache.

In a first cache partitioning control mode, allocation is controlled using a maximum capacity threshold selected using the partition ID, which identifies a maximum number of entries of the cache capacity which are allowed to be allocated with data associated with the corresponding partition ID. In implementations supporting secure and non-secure states, the threshold may define a maximum capacity allowed to be allocated with data associated with a given combination of partition ID and non-secure ID indicator. For example, the maximum capacity threshold could be set by a higher privilege process, i.e. the threshold for a given operating system can be set by the hypervisor, and the threshold for a given application can be set by the operating system.

For example, FIG. 2 shows an example where partition IDs 0, 1 and 2 have been respectively assigned maximum capacity thresholds of 50%, 50% and 40% respectively. Note that the sum of the maximum capacity thresholds defined for the different software execution environments may exceed 100%, because these are only maximum limits for the amount of the cache which can store data for a given partition ID, not a guaranteed allocation. In this case, the corresponding software execution environments will not all simultaneously use their maximum allocation.

Returning to FIG. 13, the cache 300 has a set of allocation counters 326 for tracking how many of the cache entries 304 have been allocated for data associated with each partition ID. Where security states are supported, the counters may be further partitioned based on security state. When a data value for a given partition ID is allocated to the cache, the corresponding allocation counter 326 is incremented. When data is invalidated, evicted or replaced, the allocation count for the corresponding partition ID is decremented. When a cache miss occurs in response to a given memory transaction, the cache controller 312 reads the allocation counter 326 and resource control parameter register 320 corresponding to the partition ID specified by the memory transaction, compares the allocation count with the maximum capacity threshold, and controls allocation based on the result of the comparison. If the current allocation has not yet exceeded the threshold, the required data may be allocated to the cache. However, if the allocation count is equal to or exceeds the threshold, the cache controller 312 may either determine not to allocate any data for the new request, or may evict or replace other data associated with the same partition ID from the cache before allocating the new data, to prevent the cache being allocated with greater than the threshold level of entries associated with that partition ID. If an eviction or replacement is required, the partition IDs 314 (and if provided, the victim selection information) stored in each entry of the cache can be used to determine what data evict. It will be appreciated that the above means of counting capacity is just one example and other techniques may also be used to track cache capacity.

The resource control parameter registers 320 may represent the maximum number of entries indicated by the maximum capacity threshold in different ways. For example, they could directly specify the maximum number of entries which can be allocated to the corresponding partition IDs data. Alternatively, they may specify the threshold in terms of a fraction of the total capacity of the cache which can be allocated for that partition ID. For example, the parameter may represent a scaled percentage where the parameter's width and scale factor are specified in an ID register 362 for the corresponding memory component. For example, a component may support 8-bit capacity controls scaled by 256, in which case, to allocate 30% of the capacity to a given partition, the partition's maximum capacity parameter would be 0.30*256=76.8, rounded down to 76 to prevent the allocation exceeding the desired percentage.

In embodiments where multiple security states are supported, the security state indication is also used to select the appropriate resource control parameter register 320 and allocation count 326, in combination with the partition ID.

Figure 14:
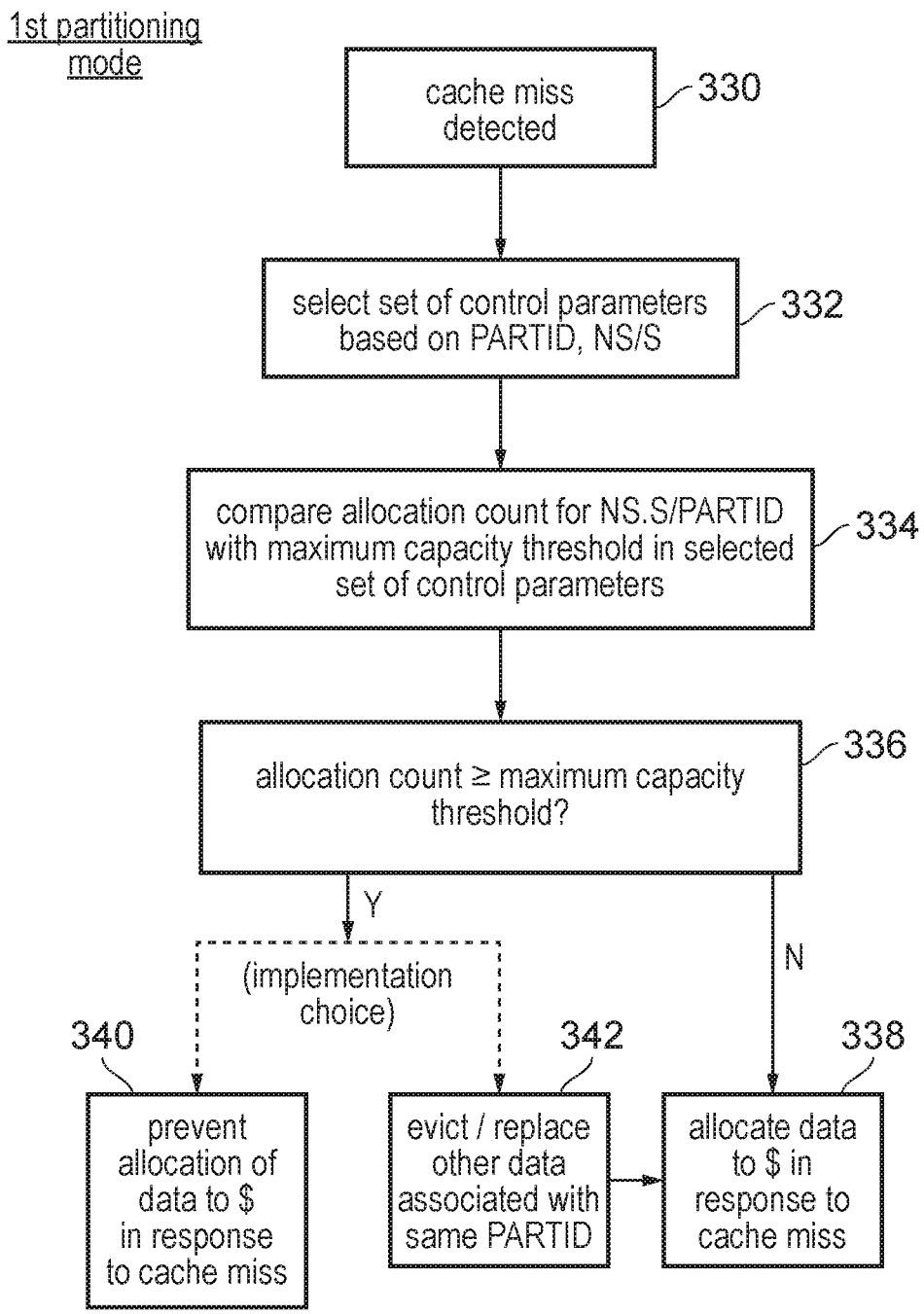
FIG. 14 is a flow diagram illustrating a method of controlling allocation to the cache in dependence on a capacity threshold selected in dependence on the partition identifier.

FIG. 14 shows a method of controlling cache allocation according to a maximum capacity threshold in the first partitioning control mode. At step 330, a cache miss is detected for a given memory transaction. At step 332 a set of resource control parameters 320 is selected based on the corresponding partition ID and security state. At step 334 the allocation count maintained by the counter 326 for the corresponding security state and partition ID is compared with the maximum capacity threshold in the selected set of resource control parameters 320, and at step 336 it is determined whether the allocation count is greater than the maximum capacity threshold. If not, then data for that request is allocated to the cache in response to the cache miss at step 338. On the other hand, if the allocation is greater than or equal to the allocation threshold then at step 340 allocation of the data to the cache is prevented or alternatively, at step 342 data associated with the same partition ID as the current request can be replaced or evicted to make way for the newly allocated data and the data can be allocated as normal at step 338 (the allocation count can sometimes exceed the threshold despite the limits provided by steps 340 or 342, e.g. if the threshold has recently been updated). Whether the method proceeds to step 340 or 342 is an implementation choice for a given implementation of cache.

Figure 15:
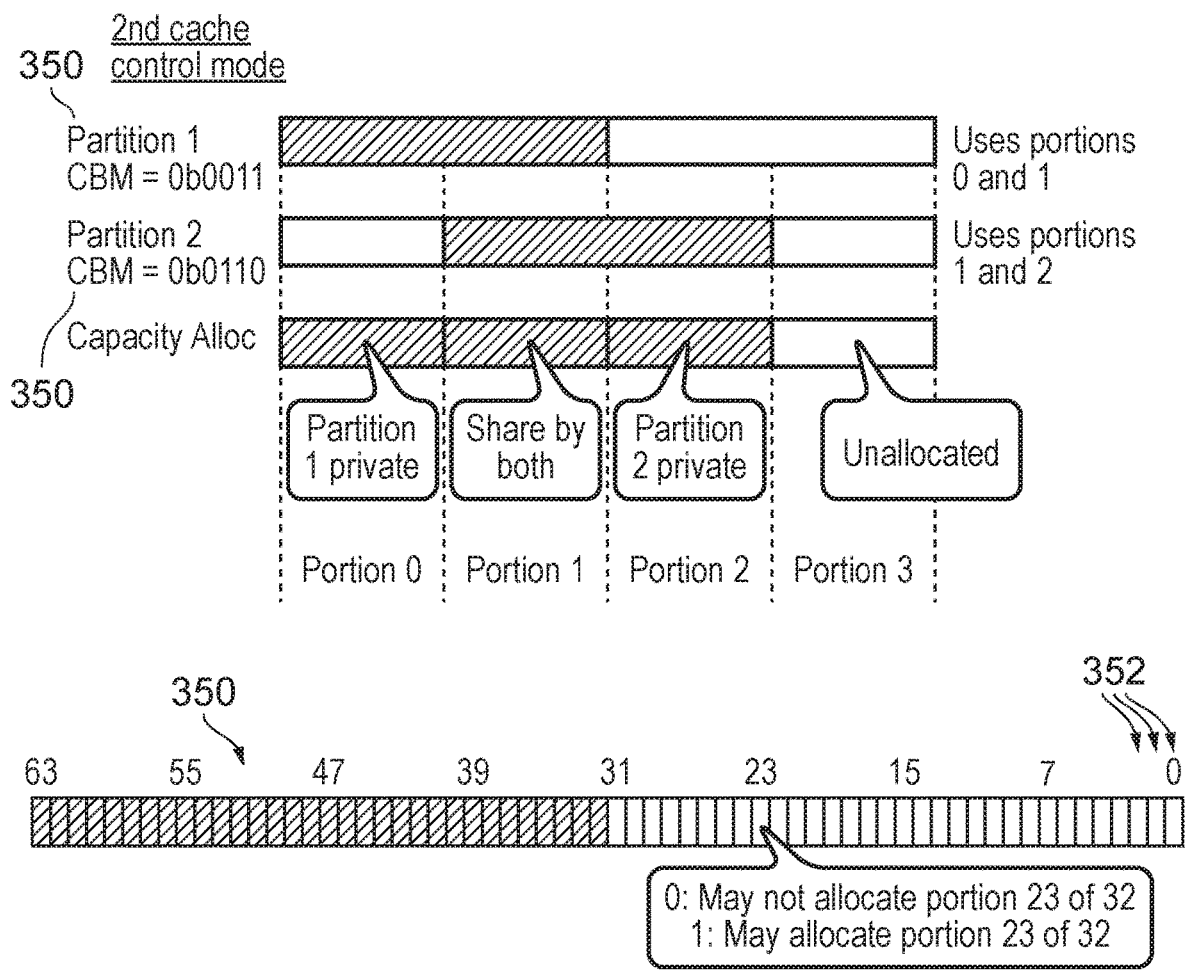
FIG. 15 illustrates an example of controlling which portions of the cache can be allocated with data in dependence on the partition identifier.

Alternatively, as shown in FIG. 15, a second cache control mode can be used in which a cache capacity portion bitmap 350 selected based on partition ID is used to control cache allocation. The bitmap 350 has multiple fields 352 which each specify whether a corresponding portion of the cache storage 302 is allowed to be allocated for storing data associated with the corresponding partition ID. For example, the bitmap 350 shown in the lower part of the example of FIG. 15 has 32 fields 352 each corresponding to $1/32^{nd}$ of the cache capacity. Each field may be set to 0 to indicate that the transactions specifying the corresponding partition ID cannot allocate data to that portion of the cache, or to 1 to indicate that the portion is allowed to be allocated with data for that partition ID.

As shown in the top part of FIG. 15, by setting different bitmaps 350 for different partition IDs, this allows some parts of the cache to be reserved for a given partition ID, while other parts may be shared among partition IDs or completely unallocated. For example, for the subset of 4 cache portions shown in FIG. 15 (this is not the whole cache capacity), portion 0 of the cache is allocated to partition 1 only, portion 1 is allocated to both partition 1 and partition 2 so that they may compete for allocations to this part of the cache, portion 2 is allocated to partition 2 only and portion 3 is not allocated to either of these partitions. Hence, when allocating data to the cache for partition 1 say, the cache controller 312 is restricted to selecting locations within portion 0 or 1, but cannot allocate to portions 2 or 3. The "portions" defined by the bitmap could be any group of one or more cache entries having the property that any given address can be allocated to at least one entry of the group, e.g. an entire way (including all sets belonging to that way) in a set-associative cache, or a more arbitrary subset of entries in a fully-associative cache.

Hence, with the second allocation control mode, when a cache miss is detected, again a set of control parameters for the corresponding partition ID and the security state is selected, but this time a cache bitmap is read and used to control which parts of the cache can be allocated with the data.

Some cache implementations may support only one of the first and second cache allocation control modes described above (e.g. a direct-mapped cache can implement the first mode but not the second mode). Other implementations may support the option to use both modes. For example, this could be useful because if the particular cache organization being used does not support giving many portions (e.g. a set-associative cache of relatively low associativity), then overlaying maximum capacity limits gives more control than portion partitioning alone.

As mentioned above, the cache 300 may have memory mapped configuration registers 360 for controlling how the resource partitioning is performed. The configuration registers 360 include an ID register 362 for identifying hardware capabilities of the cache 300, a selector register 364 for selecting a set of resource control parameters to update, and one or more configuration registers 366 for specifying the parameters to be written to the selected set of resource control parameters.

For example, the ID register 362 may specify which of the first/second cache allocation control modes are supported (threshold or bitmap based partitioning). For example, caches which do not have any allocation counters 326 may indicate that the first mode is not supported. In this case, the controlling processor may be restricted to using the second mode. Other caches may support both modes and have the flexibility to choose which is used for a given process. In this case, which mode to use may be specified within the resource control parameter register 320 for the corresponding partition ID, and programmed using the configuration registers 360.

When setting the set of resource control parameters for a given partition ID, software writes that partition ID to the selector register 364 and the parameters to be written to the corresponding configuration registers 366, by issuing memory transactions specifying the memory addresses mapped to those registers 364, 366. In response, the cache 300 reads the parameters from the configuration registers 366 and writes them to the corresponding resource control parameter register 320 identified by the relevant partition ID. When security states are supported, the selector register 364 and configuration registers 366 can be banked so that different versions are provided for the secure and less secure states respectively, with the security indication associated with the memory transaction selecting which set of registers is accessed.

Note that such a selector register 364 and configuration registers 366 to set the resource control parameters is just one example of how the resource control parameters could be set. The advantage of this approach is that it conserves address space usage in the memory system components. However, an alternative would be to use a wider interface where the array of control settings is exposed as an array of N control setting registers where N is the maximum number of partition IDs supported. This is simpler in that a control configuration can be updated for a partition with a single write and thus does not require mutual exclusion to prevent one processor accessing the selector register 364 and configuration registers 366 while another processor is configuring the memory system component. For example, if the maximum number of partition IDs is $2^{16}$ and a typical memory system component has 2 to 4 controls, this approach might use 256 KB of the address space for the array of resource control parameters.

Access to the memory mapped configuration registers 360 may be controlled by the MMU 70 for example, to limit which operating states can issue memory transactions for updating the configuration registers 360. For example, instructions executing at EL0 may not be allowed to access the configuration registers 360, but the hypervisor at EL2 may be allowed. When virtualisation of partition IDs is supported, the partition IDs used within the cache 300 are physical partition IDs, while an operating system attempting to set resource control parameters to be used for a partition ID of a corresponding application would specify a virtual partition ID. Therefore, to prevent the operating system updating the wrong resource control parameters, accesses to the addresses mapped to the configuration registers 360 may be trapped, and can trigger an exception to switch processing to the hypervisor at EL2. An exception handler in the hypervisor can then issue corresponding memory transactions with the correct physical partition ID to update the relevant set of parameters 320 at the cache 300. To achieve this, in a two stage MMU translation process, the address associated with the memory mapped registers 360 may be placed on a stage 2 address page which is different from other address space used by the memory system component.

In a similar way to the resource control partitioning, performance monitoring in the cache 300 may be partitioned based on the performance monitoring group (and partition ID in embodiments where the PMG is a sub-property of the partition ID) and the security state. A number of performance monitors 380 may be provided, each configurable to measure, count or calculate performance metrics based on filters programmed in a set of filter parameters 382 corresponding to that performance monitor 380. The filter parameters 382 may include fields for specifying a PARTID and PMG, and on receiving a memory transaction, if the filter parameters 382 have set a particular value for the PARTID/PMG fields then the performance monitor may determine whether to update its metric based on that transaction in dependence on whether the PARTID/PMG values associated with that transaction match the values set in the filter parameters 382. Note that in implementations supporting the first cache allocation mode, where allocation counters 326 are provided for tracking whether the allocation threshold is exceeded, the same allocation counters 326 may also be used for performance monitoring.

Where the cache 300 is an address translation cache, such as a TLB or page walk cache, the partitioning of cache allocation resources in this way can be useful to ensure that one software execution environment cannot allocate more than its allocated percentage/portions of the address translation cache capacity, to leave space for other software execution environments and reduce the "noisy neighbour" effect.

While FIG. 13 shows an example of a cache 300, other memory system components may have a similar set of memory mapped configuration registers 360 for configuring the memory system component parameters associated with a given partition ID/performance monitoring group/security state, and resource control parameter registers 320 for specifying sets of configuration data for corresponding partition IDs.

In particular, for other memory system components (such as a memory controller 24 or interconnect 14, 18 for example), any of the following forms of resource partitioning may be implemented:

Memory Channel Bandwidth Partitioning

The bandwidth of a main memory channel may be partitioned. Two bandwidth control schemes may be provided. A memory channel can optionally implement one or both of:
    Minimum bandwidth to which the partition has claim, even in the presence of contention
    Maximum bandwidth limit available to the partition in the presence of contention Any combination of these control schemes may be used simultaneously in a channel that supports them. Each control scheme is described in a section below.

Minimum Bandwidth Control Scheme

The minimum bandwidth control scheme gives requests from a partition preference when its current bandwidth is below the minimum and allows its requests to compete with other ordinary requests when it is above its minimum bandwidth. A partition's requests below its minimum bandwidth are thus most likely to get scheduled on the channel. The minimum bandwidth control scheme tracks memory bandwidth during an accounting period.

If the bandwidth usage by the partition as tracked during the accounting period is currently less than the partition's minimum, its requests are preferentially selected to use channel bandwidth.
    If the bandwidth usage by the partition as tracked during the accounting period is currently greater than the partition's minimum, its requests compete with other ordinary preference requests to use bandwidth on the channel.

Bandwidth that is not used by a partition during an accounting window does not accumulate. A register within the memory system component may specify the minimum bandwidth limit for a given partition ID as scaled megabytes per second. The scaled value of megabytes per second is computed as the desired megabytes per second multiplied by a scale factor that may be defined by the hardware.

Maximum Bandwidth Limit Control Scheme

The maximum bandwidth limit control scheme gives a partition ordinary preference for up to its maximum bandwidth limit during an accounting period. If the bandwidth usage by the partition as tracked during the accounting period is currently less than the partition's maximum, its requests compete for scheduling on the memory channel with ordinary preference. If the bandwidth usage by the partition as tracked during the accounting period is currently greater than the partition's maximum bandwidth limit, its requests compete with other less preferred requests to use bandwidth on the channel.

The maximum bandwidth limit control scheme gives requests from a partition ordinary preference when the bandwidth usage is below the maximum bandwidth limit and non-preference when the bandwidth usage is over the maximum bandwidth limit. Thus in the absence of contention for channel bandwidth, the partition may use more than the maximum bandwidth. Requests for bandwidth when the partition's bandwidth usage is below its maximum limit are scheduled with ordinary priority, so depending on competing requests, not all of the partition's requested bandwidth below its maximum limit may be granted by the channel scheduler. Bandwidth that is not used by a partition during an accounting window does not accumulate.

Again, the control parameter for a maximum bandwidth limit may be specified as scaled megabytes per second. The scaled value of megabytes per second is computed as the desired megabytes per second multiplied by a scale factor that may be defined by the hardware.

If both the minimum bandwidth control scheme and the maximum bandwidth limit control scheme are implemented, the following table shows the preference of the request:

| If the utilized bandwidth is | | The preference is | Description |
| --- | --- | --- | --- |
| Below the minimum | | High | Only other High requests will delay this request* |
| Above the minimum | Below the maximum limit | Medium (ordinary) | High requests serviced first then compete with other Medium requests* |
| | Above the maximum limit | Low | Not serviced if any High or Medium requests are available* |

*Note that while the preference may generally be defined as High, Medium or Low to increase the likelihood that High preference requests are serviced ahead of Medium or Low preference requests, implementations may still deviate from preference order in servicing requests to meet other goals of the implementation, such as starvation avoidance.

For all of the schemes discussed above, the control parameters for bandwidth partitioning schemes can all be expressed in a given unit, e.g. megabytes per second. This value is also equivalent to bytes transferred per microsecond. An implementation may require that each bandwidth partitioning control parameter be multiplied by a constant scaling factor before the resulting value is programmed into one of a memory system component's bandwidth control registers for a partition ID. Whether the implementation requires a scaling of the control parameter, and the scaling factor if required, may be specified in a discovery register within the memory system component (similar to the discovery register 362 of the cache described above).

For all the memory bandwidth partitioning schemes described above, memory channel bandwidth regulation may occur over an accounting period. The accounting period may be either a fixed or moving window. The width of the window may be a discoverable constant which can be read from a discovery register in the memory system component. For example, the accounting period may be at least one microsecond and it may be up to 20 microseconds or more. Longer accounting periods may require more hardware especially in moving window implementations while shorter accounting periods may have more boundary effects, especially in fixed window implementations.

In fixed window accounting, bandwidth is apportioned to requests so that each partition gets bandwidth according to the minimum and maximum for that partition. Request or local priorities can be used to resolve conflicting requests for bandwidth. When the accounting window's period is reached, a new window begins with no history except for any queue of requests that have not been previously serviced. The new window starts accumulating bandwidth from zero for each of the partitions.

With moving window accounting, the moving window keeps a history of bandwidth by partition from all commands issued in the past window width. There is no resetting of the accounting of bandwidth per partition, rather bandwidth is added when a command is processed and removed from the accounting when that command moves out of the window's history. This continuous accounting is relatively free from boundary effects, but requires more hardware to track the history of commands within the window in addition to the bandwidth counters per partition ID required by the fixed window.

The minimum bandwidth allocations of all partitions may sum to more bandwidth than is available. This is not a problem when some partitions are not using their bandwidth allocations as unused allocations are available for other partitions to use. However, when minimum bandwidth is over allocated, the minimum bandwidth that is programmed for partitions cannot always be met. Software can ensure that minimum bandwidth is not over allocated to assure that minimum bandwidth allocation programmed can be reliably delivered by the system.

Because available bandwidth may depend on one or more clock frequencies in many systems, for example DDR clock, software may wish to reallocate bandwidths when changing clocks that affect the bandwidth available. Lowering clock rates without changing allocations may result in over-allocation of bandwidth. Note: The available bandwidth on a DRAM channel is not a constant, but varies with the clock rate, the mix of reads and writes and the bank hit rate.

One skilled in the art will see that bandwidth controls of the types described are not limited to being used only at memory channel controllers, but may be deployed to control bandwidths at any memory system component.

Priority Partitioning

Unlike the other memory system resources listed in this document, priority doesn't directly affect the allocation of memory system resources, but instead has an effect on conflicts that arise for access to resources. A properly configured system should rarely have substantial performance effects due to prioritization, but priority does play an important role in oversubscribed situations whether instantaneous or sustained. Therefore, "priority partitioning" can be used as a tool to aid in isolating memory system effects between partitions.

A partition may be assigned priorities at each component in the memory system (that supports priority partitioning). This partitioning control allows different parts of the memory system to be set up to handle requests with different priorities. For example, requests from a processor to the system cache may be set to use a higher transport priority than those from the system cache to main memory.

Two types of priorities may be identified for each partition ID:

Internal priorities control priorities used in the internal operation of this memory system component. They can be used within the memory system component to prioritize internal operations. For example, a memory controller may use an internal priority to choose between waiting requests when bandwidth allocation doesn't pick a clear winner.

Downstream priorities control priorities communicated downstream to another memory system component (for example to an interconnect or memory controller). "Downstream" refers to the communication direction for requests. An "upstream" response usually uses the same transport priority as the request that generated it. A memory system component uses a downstream priority to indicate priority to a downstream component that does not have priority partitioning. This may be used to set transport priorities for an interconnect component that is downstream.

On the other hand, if a component doesn't implement priority partitioning, or it doesn't implement downstream priorities, it may use a "through priority"—the downstream priority is the same as the incoming (upstream) priority or requests. Similarly, the priority of a response that transits through a memory system component (from downstream to upstream) is the same priority as the response received (from downstream).

Controlling Partition Identifiers for Page Table Walk Memory Transactions

The examples below describe techniques for enabling page table walk memory transactions to be assigned a different partition ID to the data or instruction access memory transaction which triggered the page table walk. As shown in FIG. 3, when the processing pipeline requests an instruction fetch or a load/store operation, the virtual address specified for the instruction fetch or data access is passed to the MMU 70 which handles address translation. The address translation could be a one-stage address translation from the virtual address (VA) direct to a physical address (PA) or could be a two-stage address translation where the virtual address is translated to an intermediate physical address (IPA) and then the intermediate address is translated to a physical address. If the MMU 70 has already cached page table information within its TLBs 72, 73, 74 or page walk caches 75 that can be used to obtain the translated address (IPA or PA) from the VA, then the data or instruction access specifying the physical address and the partition ID selected as described above can simply be issued. However, if any required page table data for translating the virtual address is not already cached within the MMU 70, at least one page table walk (PTW) memory transaction may be issued to the memory system to request that the page table data is returned. In some cases, to traverse a hierarchical page table structure, several memory transactions may be needed as part of the page table walk operation performed to find the relevant page table data.

One approach can be that PTW memory transactions are simply assigned the same partition identifier as the corresponding data/instruction (D/I) access memory transaction. However, this can result in inefficient resource usage, with potential unfairness between different software execution environments which share access to the same page table data.

For example, in one usage model, a provider of an operating system may define page table data which is to be shared between a number of applications running under that operating system. The partition based resource constraints could be set with the intention of allocating each of the applications a roughly equivalent amount of resource in the memory system. However, if one of the applications is executed first and encounters a number of misses in the address translation caches 72, 74 within the MMU, that first executing application may have to issue a relatively large number of PTW memory transactions. If the PTW memory transactions are tagged with the same partition ID as the D/I accesses, then this will consume some of the memory resource allocated to that application. When a context switch to another application running under the same operating system is performed, then the second application may benefit from any caching of page table data within the MMU 70 or the data cache 8 that was performed using the resource allocated to the first executing application, and so that later executing application may not need to consume as much of its resource partition as the first application. This can result in the second application effectively seeing a higher level of performance than the first, which may be undesirable in some cases.

Hence, the examples below provide techniques whereby a PTW memory transaction can be assigned a different partition ID to corresponding D/I memory transaction. For example, this can enable the partition ID associated with the operating system to be assigned to the PTW memory transactions issued by the applications running at a lower privilege level under management of the operating system. Similarly, where multiple operating systems are managed by a shared hypervisor using shared page table data for the operating systems, then again the partition ID associated with the hypervisor may be specified for the PTW memory transactions issued by the operating systems or their underlying applications, separate from the partition IDs allocated to the D/I accesses triggered by those operating systems or applications.

Hence, by enabling different partition IDs to be assigned to PTW memory transactions compared to D/I accesses, this can improve performance and fairness of resource partitioning. Hence, as shown in FIG. 3, the MPAM generation logic 77 may output D/I page table walk specific MPAM-related information, which may be different to the MPAM-related information to be used for corresponding D/I accesses. For PTW memory transactions issued by the page table walk unit 76, a multiplexer 390 may select between the data PTW MPAM information and the instruction PTW MPAM information, depending on whether the PTW memory transaction was triggered by a data access or an instruction fetch.

However, it is recognised that not all use cases may benefit from PTW memory transactions specifying different partition IDs to D/I accesses. There are also valid use cases where it might be desirable that the PTW memory transactions do specify the same partition ID as the corresponding D/I accesses. For example, in a different programming model, an operating system may assign different page table structures to respective applications running under it, in which case as there is no sharing of page table data between the applications then it may make more sense for any memory resource consumed by PTW memory transactions from a given application to be taken from the resource allocation assigned to that particular application rather than the resource allocation of the operating system.

Hence, in some embodiments it may be useful if the processing circuitry selects, based on programmable information which is programmable in response to an instruction from at least one of the software execution environments, whether the PTW memory transaction and the corresponding D/I access memory transaction should be assigned different partition identifiers or should be assigned the same partition identifier. The setting of that programmable information may be controlled by an instruction from at least one software execution environment executing at a privilege level other than the least privileged privilege level. Various examples of the programmable information are discussed below. In some cases the programmable information could simply be a second partition ID field for the PTW memory transactions which could either be set to the same partition ID as the partition ID field used for D/I accesses or could be set to a different partition ID. However, for backwards compatibility reasons and ease of programming, it may be preferred to have some other control state which could control whether partition IDs should be assigned differently to page table walks or not, separate from the fields which actually provide the partition ID itself for D/I accesses and PTWs respectively.

Specific MPAM Information Registers for PTWs

Figure 16:
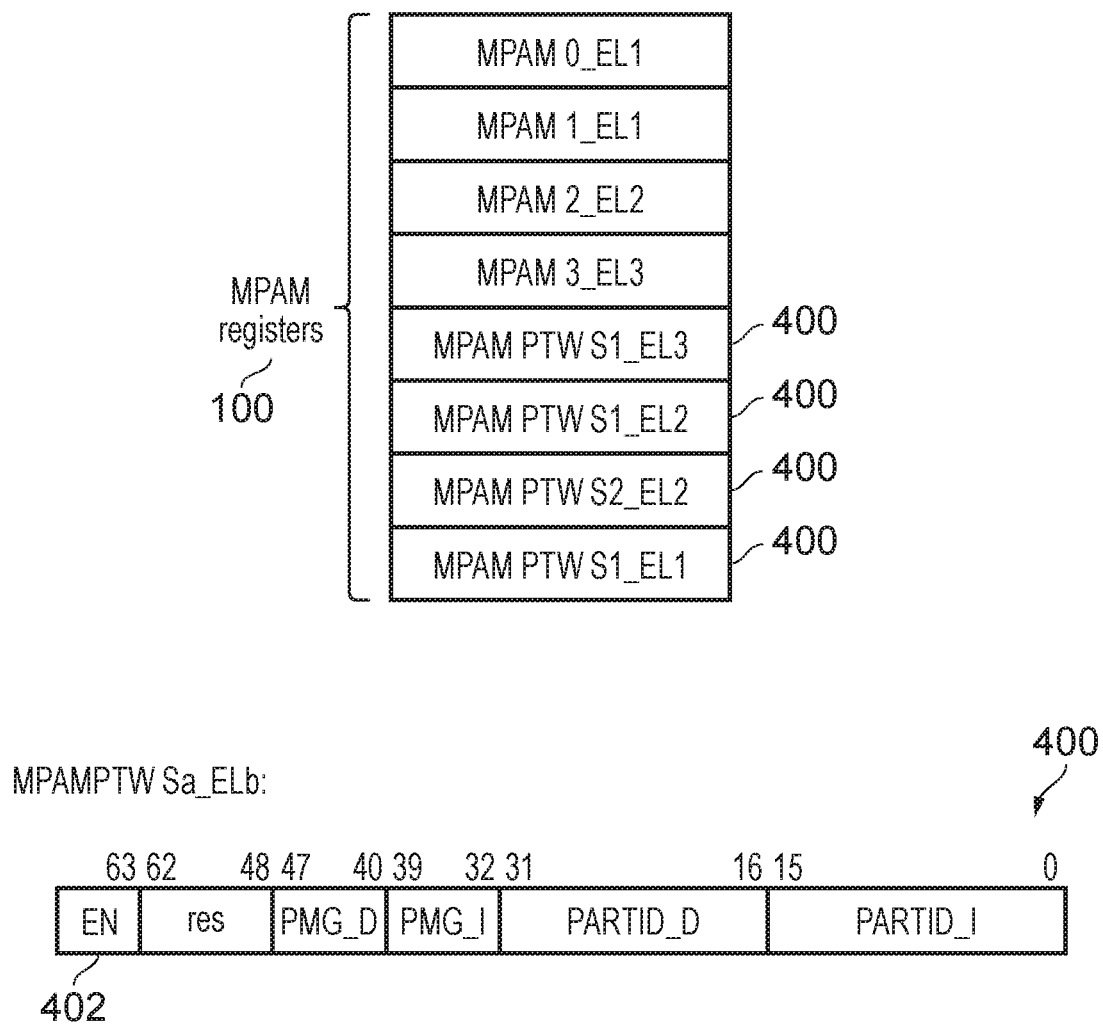
FIG. 16 shows a first example in which a number of partition identifier registers dedicated to page table walk memory transactions are provided.

FIG. 16 shows a first example of an architectural technique for enabling different partition IDs to be specified for the PTW memory transactions. In this example, the number of partition ID registers 100 is expanded compared to the examples above to include several addition registers. The partition ID registers still include the four registers shown within the bracket 100 in FIG. 6, which are used to provide the partition identifiers for D/I access memory transactions, with the relevant register being selected as described above when D/I access transactions are issued.

However, in addition to these registers the registers 100 also include four page table walk partition identifier registers 400 which are used to provide the partition identifiers to be used for PTW memory transactions. A number of PTW partition ID registers 400 are provided, with the particular register to use being selected based on the current exception level when the PTW memory transaction is issued and which stage of address translation (Stage 1 or Stage 2) is being requested. This is discussed in more detail below.

As shown at the bottom of FIG. 16, each of the PTW partition ID registers 400 specifies separate partition IDs for data and instruction accesses and separate performance monitoring group IDs for data and instruction accesses, as for the partition ID registers 100 discussed above. In addition, the page table walk partition ID registers 400 specify an enable field 402 which controls whether the PTW memory transactions use the partition IDs recorded in the PTW partition ID register 400 or whether the PTW memory transaction should use the partition ID specified in the one of the other partition ID registers 100 that would be selected for data/instruction access transactions in the current execution state.

Hence, some system registers 400 are provided to hold MPAM state to use for table walk stages. Software could choose to load each register with a PARTID different from those in any MPAMn_ELx register 100 or load it with one or both of the MPAM3_EL3.PARTID_{I,D}, MPAM2_EL2.PARTID_{I,D}, MPAM1_EL1.PARTID_{I,D} or MPAM0_EL1.PARTID_{I,D}.

In one example, given the hierarchy of software execution environments supported in the architecture as shown in FIG. 4, the MMU may support the following stages of address translation:

Secure EL3 stage 1, used to translate virtual addresses (VAs) of transactions issued at Secure EL3 into physical addresses (PAs).

Secure EL1&0 stage 1, used to translate VAs of transactions issued at Secure EL1 or Secure EL0 into PAs.

Non-secure EL2 stage 1, used to translate VAs of transactions issued at Non-secure EL2 into PAs.

Non-secure EL2&0 stage 1, used by some hypervisors, to translate VAs issued at

Non-secure EL2 or Non-secure EL0 into PAs when operating in a mode in which virtual memory configuration associated with EL0 is managed at EL2 instead of at EL1

Non-secure EL1&0 stage 1, used to translate VAs of transactions issued at Non-secure EL1 or Non-secure EL0 into intermediate physical addresses (IPAs).

Non-secure EL1&0 stage 2, used to translate IPAs from Non-secure EL1&0 stage 1 into PAs.

Folding the two security states together reduces the count from 6 to 5. Also, EL2 stage 1 and EL2&0 stage 1 can be combined since they cannot be used simultaneously, reducing the count to 4:

EL3 stage 1
EL2 stage 1 or EL2&0 stage 1
EL1&0 stage 2
EL1&0 stage 1

Hence, the MPAM register may include four additional PTW partition ID registers 400 as follows:

MPAMPTWS1_EL3: Used for EL3 stage 1
MPAMPTWS1_EL2: Used for EL2 stage 1 and EL2&0 stage 1
MPAMPTWS2_EL2: Used for EL1&0 stage 2
MPAMPTWS1_EL1: Used for EL1&0 stage 1

Here, the notation MPAMPTWSa_ELb indicates that the register is used for stage a of address translation and that the lowest privilege state that can rewrite the contents of the register is ELb.

All 4 of these registers have the same fields as shown in FIG. 16:

EN Enable use of the PARTID and PMG values in this register for those translation stages that use this register. If EN=='0', the MPAM information from the access that caused this table walk is used. If EN=='1', the MPAM information is generated from the fields of this register.

PMG_D Performance monitoring group to use for table walks initiated by data accesses.

PMG_I Performance monitoring group to use for table walks initiated by instruction accesses.

PARTID_D Partition ID to use for table walks initiated by data accesses. PARTID_I Partition ID to use for table walks initiated by instruction accesses.

In summary, with the approach shown in FIG. 16 the partition identifier registers which specify respective partition identifiers for different operating states can be supplemented with additional page table walk partition identifier registers. When a memory transaction is issued, the processing circuitry selects a partition identifier stored in a selected partition identifier register and assigns to the memory transaction a partition identifier depending on the selected partition identifier. Note that virtualisation of partition identifiers may still be supported as discussed above, at least for accesses initiated from EL0 or EL1, so the memory transaction may be assigned a partition identifier value which may differ from the one specified in the selected partition identifier register. The selected partition identifier may depend on a current privilege level from which the memory transaction is issued.

Hence, at least one page table walk partition identifier register may be selected as the selected partition identifier register which provides the selected partition identifier to use for a page table walk memory transaction. The processing circuitry may support a number of stages of address translation, with each stage of address translation based on a respective page table structure, and which partition identifier register is the selected partition identifier register for page table walk memory transactions may depend on the stage of address translation that is associated with the page table walk memory transaction. Different execution environments which manage the respective page table structures for the different stages of address translation may have different requirements for the control of resource partitioning and so this is why it can be useful for different partition identifiers to be provided for each stage of address translation. Alternatively some stages of address translation could share the same partition identifier register, and in that case it may be needed to reprogram the register when switching between execution contexts.

In some implementations, the enable fields 402 shown above may not be necessary and one approach could be that PTW memory transactions always uses the partition ID from one of the page table walk registers 400 rather than the normal partition ID registers 100 used for D/I accesses. However, this may increase programming burden as if a particular use case wishes to assign the same partition IDs to PTW memory transactions as for D/I transactions then both registers would need to be written with the relevant partition ID. Also, for backwards compatibility with code written for systems which do not have the additional page table walk partition ID registers 400, a new hardware implementation should act like a prior implementation until software which supports the new hardware features enables those features. Hence, it can be useful to provide the enable indication 402. If not explicitly enabled by software then the system may reset the enable indication 402 in the disabled state, so that page table walk transactions will use a partition ID selected from one of the other non-PTW partition ID registers 100.

Hence, for a given PTW memory transaction, the processing circuitry may determine whether the enable field of a corresponding PTW partition identifier register specifies the enabled state or the disabled state. Which register is the corresponding PTW partition identifier register may depend on the current operating state (security state/privilege level) and stage of address translation for which the PTW memory transaction is issued as discussed above. When the enable field indicates the enabled state then the corresponding PTW partition identifier register itself may be used as the selected partition identifier register for the PTW memory transaction, and a partition ID can then be selected from that register. On the other hand, when the enable field of the corresponding PTW partition identifier register indicates a disabled state then the selected partition ID register may be a partition ID register other than the at least one PTW partition ID register 400. In particular, when the enable field of the corresponding partition ID register is in the disabled state, the selected partition ID register may be the same one of the non-PTW partition ID registers 100 which would have been selected if a data/instruction access memory transaction had been issued from the current state of execution.

It can be useful for the PTW partition ID registers to specify separate data and instruction partition IDs. This can allow different applications or operating systems to share the same partition ID for instruction page table walks but use different partition IDs for data page table walks for example. Hence, for PTW memory transactions which correspond to a data access memory transaction, the selected partition ID may be based on the data partition identifier specified by the PARTID_D field of the selected partition ID register MPAMPTWSn_ELx, while for PTW memory transactions corresponding to instruction access memory transactions, the selected partition identifier may be the instruction partition identifier from the PARTID_I field of the selected partition ID register MPAMPTWSn_ELx.

Alternatively, other examples could choose not to provide separate instruction and data fields in the PTW partition ID registers and just have the same partition ID used for both PTW memory transactions associated with data accesses and PTW memory transactions associated with instruction accesses.

Also, as in the general embodiments discussed above, while FIG. 16 shows separate performance monitoring groups (PMGs) compared to the PARTIDs used for resource control, other approaches could provide the same partition ID used for both resource control and performance monitoring.

Configurable Sources of MPAM Information

Figure 17:
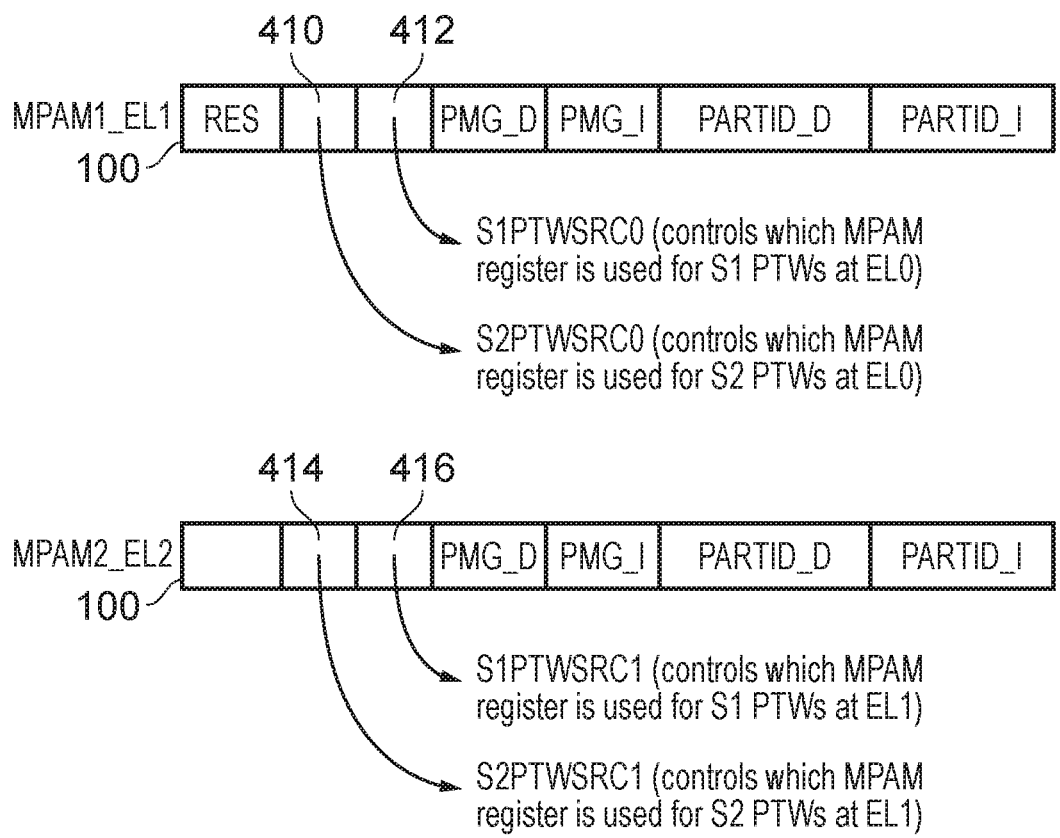
FIG. 17 shows an alternative example in which configuration information is provided for controlling whether page table walk transactions use partition identifiers from a partition identifier register associated with a current privilege level or a more privileged privilege level.

FIG. 17 shows a second example of enabling PTW memory transactions to use different partition IDs to the corresponding D/I memory transactions. In this example, rather than providing additional partition ID registers dedicated to PTW transactions, the PTW memory transactions may share the same partition ID registers used for D/I access memory transactions. However, as shown in FIG. 17, some additional control state 410 to 416 is provided in some of the partition ID registers 100 to redirect, if desired, PTW transactions from a given execution environment to use the partition identifiers specified in one of the partition ID registers 100 other than the current execution environment.

This approach comes from the observation that the exception levels above the current exception level already contain MPAM information tied to the software environments running at those levels. This means that no additional MPAM information needs to be stored in the CPU and this functionality provides controls that select the exception level from which to get the MPAM information during translation table accesses of different kinds but does not include additional registers or even register bits to hold MPAM partition IDs beyond those already present in the general scheme described above.

The MPAM information to use depends on the current exception level and the stage of translation in use. Two-stage translation schemes use two stages during the translation processes and the MPAM information used may need to be different for each stage. The source of the MPAM information is controlled separately for each stage in a two-stage scheme.

Each MPAMn_ELx register gets 1 or 2 new fields which control the source of the MPAM information for page table walks. One field (S1PTWSRCn) is present in each of the MPAM2_EL2 and MPAM1_EL1 registers. S1PTWSRCn is the source of the MPAM information for a single stage page table walk or for the first stage of a two stage PTW performed by execution at ELn. The second field (S2PTWSRCn) is present in each of MPAM2_EL2 and MPAM1_EL1. The second field controls the source of the MPAM information for a stage-2 PTW performed by execution at ELn. The settings in each of these are basically:

Backward compatible (i.e. PTW transactions will use the same partition information as the corresponding Data/Instruction access)

Use execution ELn's MPAM information for PTW transactions

Use execution ELn+1's MPAM information for PTW transactions.

Hence, new control fields are added to some of the MPAM partition ID registers 100. Register fields that begin with "S1PTW" control the source of MPAM information for Stage-1 page table walks while those that begin with "S2PTW" control for Stage-2 page table walks. The final digit indicates the execution EL where that setting is used.

As shown in FIG. 17, MPAM1_EL1 gets S1PTWSRC0 and S2PTWSCR0 fields added (4 bits), and MPAM2_EL2 gets S1PTWSRC1 and S2PTWSCR1 fields added (4 bits).

S1PTWSRC0 (bits[51:50]): Stage-1 Page Table Walk (Hypervisor) Source Control for EL0 S1PTWSRC0 is a field 412 added in register MPAM1_EL1 which controls whether MPAM0_EL1 or MPAM1_EL1 register is used as the source of PARTIDs for stage-1 page table walks. MPAM1_EL1.S1PTWSRC0 is not used if TGE=='1' (TGE is a flag in the hypervisor control register (HCR) 116 which when TGE=1 indicates that types of exceptions arising at EL0 that would normally be routed to EL1 (if TGE=0) should instead be routed to EL2).

S1PTWSRC0 412 can take the following values (each represented as a binary 2-bit value):

0: Backward compatible—PTW transactions use same partition information that would be used for the corresponding data/instruction access memory transaction.

1: In EL0 and TGE==0, if MPAMHCR_EL2.GSTAPP_PLK==0 then use MPAM0_EL1 PARTID and PMG fields for Stage-1 PTW accesses. If MPAMHCR_EL2.GSTAPP_PLK==1, use MPAM1_EL1 PARTID and PMG fields for Stage-1 PTW accesses. MPAMHCR_EL2.GSTAPP_PLK is the control flag 115 discussed above.

In EL0 and TGE==1, use MPAM0_EL1 PARTID and PMG fields for Stage-1 PTW accesses.

2: In EL0 and TGE==0, use MPAM1_EL1 PARTID and PMG fields for Stage-1 PTW accesses.

In EL0 and TGE==1, use MPAM2_EL2 PARTID and PMG fields for Stage-1 PTW accesses.

3: Reserved.

S1PTWSRC1 (bits[51:50]): Stage-1 Page Table Walk (Hypervisor) Source Control for EL1 In MPAM2_EL2, an additional field 416 is added.

S1PTWSRC1 controls whether MPAM1_EL1 or MPAM2_EL1 register is used as the source of PARTIDs for stage-1 table walks caused by execution at EL1.

S1PTWSRC1(bits[51:50])

0: Backward compatible.

1: In EL1, use MPAM1_EL1 PARTID and PMG fields for Stage-1 PTW accesses.

2: In EL1, use MPAM2_EL2 PARTID and PMG fields for Stage-1 PTW accesses.

3: Reserved.

S2PTWSRC0 (bits[53:52]): Stage-2 Page Table Walk (Hypervisor) Source Control for EL0 An additional field 410 is added to MPAM1_EL1, defined as follows: S2PTWSRC0 (bits[53:52]): Stage-2 Page Table Walk Source Control 0: Backward compatible.

1: In EL0 and TGE==0, use MPAM1_EL1.PARTID_D or PARTID_I for Stage-2 PTW memory accesses. PTWs caused by instruction fetch accesses use PARTID_I and PTWs caused by load/store accesses use PARTID_D. In EL0 and TGE==1, use MPAM2_EL2.PARTID_D or PARTID_I for Stage-2 PTW memory accesses. PTWs caused by instruction fetch accesses use PARTID_I and PTWs caused by load/store accesses use PARTID_D.

2: In EL0, use MPAM2_EL2.PARTID_D or PARTID_I for Stage-2 PTW memory accesses. PTWs caused by instruction fetch accesses use PARTID_I and PTWs caused by load/store accesses use PARTID_D.

3: Reserved.

S2PTWSRC1 (bits[53:52]): Stage-2 Page Table Walk (Hypervisor) Source Control for ELI An additional field 414 is added to MPAM2_EL2, defined as follows:

S2PTWSRC1 (bits[53:52]): Stage-2 Page Table Walk (Hypervisor) Source Control for EL1

0: Backward compatible.

1: In EL1, use MPAM1_EL1.PARTID_D or PARTID_I for stage-2 PTW memory accesses. PTWs caused by instruction fetch accesses use PARTID_I and PTWs caused by load/store accesses use PARTID_D.

2: In EL1, use MPAM2_EL2.PARTID_D or PARTID_I for stage-2 PTW memory accesses. PTWs caused by instruction fetch accesses use PARTID_I and PTWs caused by load/store accesses use PARTID_D.

3: Reserved.

Hence, with this approach for a PTW memory transaction issued from a current privilege level, the processing circuitry is capable of selecting, as the selected partition ID register to be used for generating the partition identifier for the PTW memory transaction, a partition ID register associated with a more privileged privilege level than the current privilege level. This can reduce the hardware cost of implementing the support for different partition IDs for PTW memory transactions, as less register storage space is needed although it may need slightly more complex selection logic for selecting which partition ID to use for a given memory transaction.

The processing circuitry may select, based on programmable configuration information, whether the selected partition ID register should be the partition ID register associated with the current privilege level or a partition ID register associated with a more privileged privilege level than the current privilege level. This programmable configuration information may be programmable by an instruction which is executed at that more privileged privilege level. Hence, for example an operating system could set the programmable state 410, 412 to control whether applications running under it use their own partition ID register for PTW memory transactions or reference the register used for D/I memory transactions in the operating system. Similarly, a hypervisor can use the state 414, 416 to control which partition ID register 100 is selected for use by stage 1 or stage 2 PTW transactions issued at EL1 by the operating system.

As shown in FIG. 17, in some cases there may be a number of items of programmable configuration information 410, 412, 414, 416, each associated with different combinations of privilege level, security state and address translation stage. Hence, for a given PTW memory transaction one of the items of programmable configuration information may be selected depending on at least one of the current privilege level, the current security state and the current stage of address translation for which the PTW memory transaction is issued. Based on the selected item of programmable configuration information, the processing circuitry can then select whether the selected partition ID register should be the one associated with the current privilege level or the partition ID register associated with the more privileged privilege level.

While FIG. 17 shows a particular example of how these items of programmable configuration information 410 to 416 could be stored within the MPAM control registers 68, it would also be possible to use a different layout of the control state or to store the programmable configuration information 410 to 416 in a separate register from the partition ID registers 100 themselves.

Figure 18:
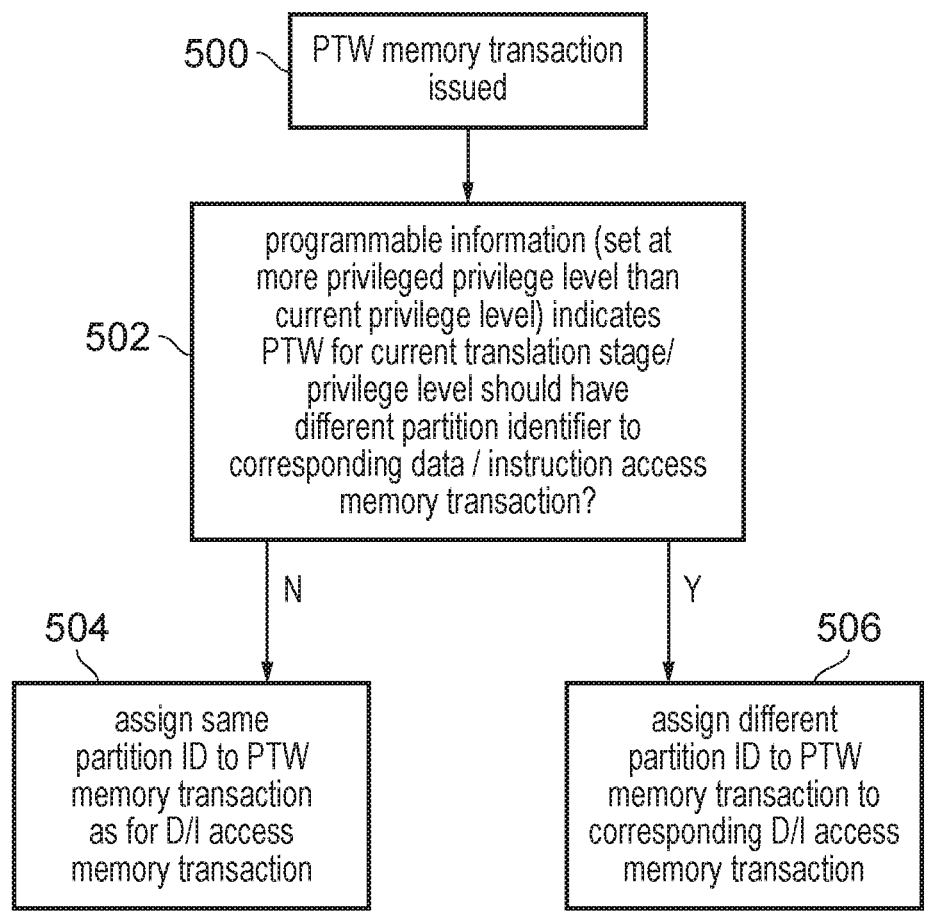
FIG. 18 shows a method of controlling which partition identifiers are used for page table walk memory transactions.

FIG. 18 shows a flow diagram showing a method of handling partition ID allocation for PTW memory transactions. At step 500 a PTW memory transaction is issued by the MMU 70. At step 502 the processing circuitry checks whether the programmable information (which could for at least some privilege levels be set at a more privileged privilege level than the current privilege level) indicates whether the PTW transactions for the current translation stage and privilege level should have a different partition ID to corresponding data/instruction access memory transactions. This programmable information could be one of the fields 410 to 416 shown in FIG. 17 which redirects PTW transactions to refer to a different MPAN register 100 to the corresponding D/I instruction accesses, or could be the enable field 402 of the dedicated PTW partition ID registers shown in FIG. 16, for example.

If the programmable information selected for the current access is in the disabled state indicating that PTW transactions should be handled in the same manner as D/I access memory transactions, then at step 504 the same partition ID is assigned to the PTW memory transaction as would be assigned to the corresponding D/I access memory transaction. For example a partition ID register can be selected based on the current exception level and GSTAPP_PLK field using the approach shown in FIG. 8 as described above, and the relevant one of the partition IDs (instruction or data) can be assigned to the PTW memory transaction.

However, if at step 502 it is determined that the programmable information indicates that the option of providing separate partition IDs for the PTW transactions at the current privilege level and translation stage has been enabled, then at step 506 a different partition ID is assigned to the PTW memory transaction compared to the corresponding D/I access memory transaction. For example, if the approach shown in FIG. 16 is used then a dedicated PTW partition ID register can be referenced to obtain the partition ID value to be used (subject to virtualisation mapping the value), or with the approach shown in FIG. 17 then a partition ID register for a privilege level other than the current privilege level could be referenced to obtain the partition ID used to derive the partition ID value to assign to the memory transaction.

In the present application, the words "configured to . . ." are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

The invention claimed is:

1. An apparatus comprising:
processing circuitry to process instructions from one of a plurality of software execution environments; and
at least one memory system circuit to handle memory transactions issued by the processing circuitry in response to the instructions; in which:
in response to a memory transaction issued by the processing circuitry specifying a partition identifier selected depending on which software execution environment caused the memory transaction to be issued, the at least one memory system circuit is configured to control allocation of resources for handling the memory transaction or manage contention for said resources depending on a selected set of parameters selected depending on the partition identifier specified by the memory transaction, or to control, depending on the partition identifier specified by the memory transaction, whether performance monitoring data is updated in response to the memory transaction; and
when a page table walk memory transaction is issued by the processing circuitry to request access, from memory, to page table data required for obtaining a translated target address of a corresponding data/instruction access memory transaction, the processing circuitry is capable of assigning, to the page table walk memory transaction, a value of the partition identifier different than the value assigned to the partition identifier for the corresponding data/instruction access memory transaction.

2. The apparatus according to claim 1, in which the processing circuitry is configured to select, based on programmable information which is programmable in response to an instruction from at least one of the plurality of software execution environments, whether to:
assign different partition identifiers to the page table walk memory transaction and the corresponding data/instruction access memory transaction, or
assign a same partition identifier to the page table walk memory transaction and the corresponding data/instruction access memory transaction.

3. The apparatus according to claim 2, in which the programmable information is programmable in response to an instruction from at least one software execution environment executing at a privilege level other than a least privileged privilege level.

4. The apparatus according to claim 1, comprising a plurality of partition identifier registers each to specify a respective partition identifier; in which:
on issuing a memory transaction, the processing circuitry is configured to select a partition identifier stored in a selected partition identifier register, and assign to the memory transaction a partition identifier depending on the selected partition identifier stored in the selected partition identifier register.

5. The apparatus according to claim 4, in which the processing circuitry is configured to execute instructions from one of a plurality of privilege levels, and to select the selected partition identifier register based at least on a current privilege level from which the memory transaction is issued.

6. The apparatus according to claim 4, in which the plurality of partition identifier registers include at least one page table walk partition identifier register selectable as the selected partition identifier register to provide the selected partition identifier to use for a page table walk memory transaction.

7. The apparatus according to claim 6, in which the processing circuitry is configured to support a plurality of stages of address translation, each stage of address translation based on a respective page table structure;
the plurality of partition identifier registers include a plurality of page table walk partition identifier registers each associated with at least one stage of address translation; and
for a page table walk memory transaction, the processing circuitry is configured to select which partition identifier register is the selected partition identifier register based on the stage of address translation associated with the page table walk memory transaction.

8. The apparatus according to claim 6, in which each page table walk partition identifier register comprises an enable field specifying one of an enabled state and a disabled state;
for a given page table walk memory transaction, the processing circuitry is configured to determine whether the enable field of a corresponding page table walk partition identifier register specifies the enabled state or the disabled state;
when the enable field of the corresponding page table walk partition identifier register indicates the enabled state, the selected partition identifier register is the corresponding page table walk partition identifier register; and
when the enable field of the corresponding page table walk partition identifier register indicates the disabled state, the selected partition identifier register is a partition identifier register other than said at least one page table walk partition identifier register.

9. The apparatus according to claim 6, in which each page table walk partition identifier register specifies a data partition identifier and an instruction partition identifier; and
when the selected partition identifier register is one of said at least one page table walk partition identifier register:
for a page table walk memory transaction corresponding to a data access memory transaction, the processing circuitry is configured to select as the selected partition identifier the data partition identifier specified by the selected partition identifier register; and
for a page table walk memory transaction corresponding to an instruction access memory transaction, the processing circuitry is configured to select as the selected partition identifier the instruction partition identifier specified by the selected partition identifier register.

10. The apparatus according to claim 4, in which the processing circuitry is configured to execute instructions from one of a plurality of privilege levels; and for a page table walk memory transaction issued from a current privilege level, the processing circuitry is capable of selecting, as the selected partition identifier register, a partition identifier register associated with a more privileged privilege level than said current privilege level.

11. The apparatus according to claim 4, in which the processing circuitry is configured to execute instructions from one of a plurality of privilege levels; and for a page table walk memory transaction issued from a current privilege level, the processing circuitry is configured to select, based on programmable configuration information, whether the selected partition identifier register is a partition identifier register associated with said current privilege level or a partition identifier register associated with a more privileged privilege level than said current privilege level.

12. The apparatus according to claim 11, in which said programmable configuration information is programmable by an instruction executed at said more privileged privilege level.

13. The apparatus according to claim 11, in which said programmable configuration information comprises a plurality of items of programmable configuration information;

for a page table walk memory transaction, the processing circuitry is configured to select one of the items of programmable configuration information depending on at least one of:
 a privilege level from which the page table walk memory transaction is issued;
 a security state of the processing circuitry from which the page table walk memory transaction is issued; and
 which of a plurality of stages of address translation is associated with the page table walk memory transaction, each stage of address translation based on a respective page table structure; and the processing circuitry is configured to control, based on the selected item of programmable configuration information, whether the selected partition identifier register is a partition identifier register associated with said current privilege level or a partition identifier register associated with said more privileged privilege level than said current privilege level.

14. The apparatus according to claim 1, in which said at least one memory system circuit comprises at least one of:
 a cache configured to control allocation of data to the cache in response to the memory transaction depending on the selected set of parameters; and
 an interconnect or memory controller configured to control allocation of bandwidth or buffer occupancy for handling said memory transaction in dependence on the selected set of memory system circuits.

15. An apparatus comprising:
means for processing instructions from one of a plurality of software execution environments; and
at least one means for handling memory transactions issued by the means for processing in response to the instructions; in which:
in response to a memory transaction issued by the means for processing specifying a partition identifier selected depending on which software execution environment caused the memory transaction to be issued, the at least one means for handling memory transactions is configured to control allocation of resources for handling the memory transaction or manage contention for said resources depending on a selected set of parameters selected depending on the partition identifier specified by the memory transaction, or to control, depending on the partition identifier specified by the memory transaction, whether performance monitoring data is updated in response to the memory transaction; and
when a page table walk memory transaction is issued by the means for processing to request access, from memory, to page table data required for obtaining a translated target address of a corresponding data/instruction access memory transaction, the means for processing is capable of assigning, to the page table walk memory transaction, a value of the partition identifier different than the value assigned to the partition identifier for the corresponding data/instruction access memory transaction.

16. A method comprising:
processing instructions from one of a plurality of software execution environments; and
handling memory transactions issued in response to the instructions; in which:
in response to a memory transaction specifying a partition identifier selected depending on which software execution environment caused the memory transaction to be issued, at least one memory system circuit controls allocation of resources for handling the memory transaction or manages contention for said resources depending on a selected set of parameters selected depending on the partition identifier specified by the memory transaction, or controls, depending on the partition identifier specified by the memory transaction, whether performance monitoring data is updated in response to the memory transaction; and
when a page table walk memory transaction is issued to request access to page table data, from memory, required for obtaining a translated target address of a corresponding data/instruction access memory transaction, the partition identifier assigned to the page table walk memory transaction is allowed to have a value of the partition identifier different than the value assigned to the partition identifier for the corresponding data/instruction access memory transaction.

\* \* \* \* \*